United States Patent
Pervan et al.

(10) Patent No.: US 9,314,888 B2
(45) Date of Patent: *Apr. 19, 2016

(54) METHODS AND ARRANGEMENTS RELATING TO EDGE MACHINING OF BUILDING PANELS

(71) Applicant: Valinge Innovation AB, Viken (SE)

(72) Inventors: Darko Pervan, Viken (SE); Marcus Bergelin, Viken (SE); Christian Boo, Kagerod (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,483

(22) Filed: Dec. 11, 2014

(65) Prior Publication Data

US 2015/0107079 A1    Apr. 23, 2015
US 2015/0343577 A9    Dec. 3, 2015

Related U.S. Application Data

(63) Continuation of application No. 12/832,754, filed on Jul. 8, 2010, now Pat. No. 8,931,174.

(60) Provisional application No. 61/234,491, filed on Aug. 17, 2009.

(30) Foreign Application Priority Data

Jul. 31, 2009   (SE) ...................... 0901054

(51) Int. Cl.
*E04F 15/02*   (2006.01)
*B23P 19/04*   (2006.01)
(Continued)

(52) U.S. Cl.
CPC . *B23P 19/04* (2013.01); *B27F 1/06* (2013.01); *B27M 3/04* (2013.01);
(Continued)

(58) Field of Classification Search
CPC ................... E04F 15/02038; E04F 15/02005; E04F 15/02033; E04F 2201/02–2201/028; Y10T 29/49623; Y10T 29/49629
See application file for complete search history.

(56) References Cited

U.S. PATENT DOCUMENTS 2,430,200 A   11/1947   Wilson
3,656,220 A    4/1972   Dupuis
(Continued)

FOREIGN PATENT DOCUMENTS

DE   2 159 042      6/1973
DE   33 43 601 A1   6/1985
(Continued)

OTHER PUBLICATIONS

International Search Report issued in PCT/SE2010/050796, mailed Jan. 4, 2011, Swedish Patent Office, Stockholm, SE, 5 pages.
(Continued)

*Primary Examiner* — Christopher Besler
(74) *Attorney, Agent, or Firm* — Buchanan Ingersoll & Rooney P.C.

(57) ABSTRACT

A tool configuration 68, 68' incorporating a preprocessing step 67, 67' and a method incorporating the tool configuration with its preprocessing step, producing an improved locking system of a floor panel 1, 1'. With the special tool configuration, and the preprocessing step changing the properties of the surface layer, certain surfaces are profiled of the joint edge of the floor panel, resulting in decreased tolerances. An equipment having an upper belt or chain guided in a horizontal direction, by an upper guiding device, and configured to press the floor panel vertically towards the lower chain, decreasing the tolerances of the produced floor panel as well.

4 Claims, 23 Drawing Sheets

(51) Int. Cl.
    *B27F 1/06*    (2006.01)
    *B27M 3/04*    (2006.01)

(52) U.S. Cl.
    CPC .. *E04F 15/02038* (2013.01); *E04F 2201/0153* (2013.01); *Y10T 29/49623* (2015.01); *Y10T 29/49629* (2015.01); *Y10T 29/49826* (2015.01); *Y10T 29/49995* (2015.01); *Y10T 29/52* (2015.01)

(56) References Cited

U.S. PATENT DOCUMENTS

| | | |
|---|---|---|
| 3,731,445 A | 5/1973 | Hoffmann et al. |
| 4,083,390 A | 4/1978 | Ingham |
| 4,169,688 A | 10/1979 | Toshio |
| 4,426,820 A | 1/1984 | Terbrack et al. |
| 4,495,733 A | 1/1985 | Börner et al. |
| 4,498,361 A | 2/1985 | Grace |
| 4,512,131 A | 4/1985 | Laramore |
| 4,564,320 A | 1/1986 | Roseliep |
| 4,599,841 A | 7/1986 | Haid |
| 4,819,932 A | 4/1989 | Trotter, Jr. |
| 5,135,597 A | 8/1992 | Barker |
| 5,295,341 A | 3/1994 | Kajiwara |
| 5,352,068 A | 10/1994 | Roseliep |
| 5,577,357 A | 11/1996 | Civelli |
| 5,860,267 A | 1/1999 | Pervan |
| 5,950,389 A | 9/1999 | Porter |
| 6,006,486 A | 12/1999 | Moriau et al. |
| 6,182,410 B1 | 2/2001 | Pervan |
| 6,203,653 B1 | 3/2001 | Seidner |
| 6,254,301 B1 | 7/2001 | Hatch |
| 6,295,779 B1 | 10/2001 | Canfield |
| 6,332,733 B1 | 12/2001 | Hamberger |
| 6,339,908 B1 | 1/2002 | Chuang |
| 6,358,352 B1 | 3/2002 | Schmidt |
| 6,418,683 B1 | 7/2002 | Martensson et al. |
| 6,450,235 B1 | 9/2002 | Lee |
| 6,490,836 B1 | 12/2002 | Moriau et al. |
| 6,497,079 B1 | 12/2002 | Pletzer et al. |
| 6,576,079 B1 | 6/2003 | Kai |
| 6,584,747 B2 | 7/2003 | Kettler et al. |
| 6,591,568 B1 | 7/2003 | Pålsson |
| 6,681,820 B2 | 1/2004 | Olofsson |
| 6,729,091 B1 | 5/2004 | Martensson |
| 6,763,643 B1 | 7/2004 | Martensson |
| 6,802,166 B1 | 10/2004 | Gerhard |
| 6,854,235 B2 | 2/2005 | Martensson |
| 6,880,307 B2 | 4/2005 | Schwitte et al. |
| 7,040,068 B2 | 5/2006 | Moriau et al. |
| 7,051,486 B2 | 5/2006 | Pervan |
| 7,127,860 B2 | 10/2006 | Pervan et al. |
| 7,171,791 B2 | 2/2007 | Pervan |
| 7,637,068 B2 | 12/2009 | Pervan |
| 7,677,005 B2 | 3/2010 | Pervan |
| 7,757,452 B2 | 7/2010 | Pervan |
| 7,841,150 B2 | 11/2010 | Pervan |
| 8,733,410 B2 | 5/2014 | Pervan |
| 8,931,174 B2 | 1/2015 | Pervan et al. |
| 2002/0025232 A1 | 2/2002 | Miller |
| 2003/0037504 A1 | 2/2003 | Schwitte et al. |
| 2003/0140478 A1 | 7/2003 | Olofsson |
| 2003/0180091 A1 | 9/2003 | Stridsman |
| 2004/0016196 A1 | 1/2004 | Pervan |
| 2004/0035078 A1 | 2/2004 | Pervan |
| 2004/0206036 A1 | 10/2004 | Pervan |
| 2004/0211143 A1 | 10/2004 | Hanning |
| 2005/0034405 A1 | 2/2005 | Pervan |
| 2005/0160694 A1 | 7/2005 | Pervan |
| 2005/0252130 A1 | 11/2005 | Martensson |
| 2006/0070333 A1 | 4/2006 | Pervan |
| 2007/0028547 A1 | 2/2007 | Grafenauer et al. |
| 2008/0041008 A1 | 2/2008 | Pervan |
| 2008/0168737 A1 | 7/2008 | Pervan |
| 2008/0172856 A1 | 7/2008 | Brouckaert |
| 2008/0216434 A1 | 9/2008 | Pervan |
| 2008/0216920 A1 | 9/2008 | Pervan |
| 2009/0049792 A1 | 2/2009 | Cappelle et al. |
| 2009/0101236 A1 | 4/2009 | Boucke |
| 2010/0170189 A1 | 7/2010 | Schulte |
| 2011/0023302 A1 | 2/2011 | Pervan et al. |
| 2011/0023303 A1 | 2/2011 | Pervan et al. |
| 2011/0209430 A1 | 9/2011 | Pervan |
| 2013/0333182 A1 | 12/2013 | Pervan et al. |
| 2014/0223852 A1 | 8/2014 | Pervan |

FOREIGN PATENT DOCUMENTS

| | | |
|---|---|---|
| DE | 33 43 601 C2 | 6/1985 |
| DE | 42 15 273 A1 | 11/1993 |
| DE | 42 42 530 A1 | 6/1994 |
| DE | 196 01 322 A | 5/1997 |
| DE | 102 41 769 B3 | 4/2004 |
| EP | 1 048 423 A2 | 11/2000 |
| EP | 1 120 515 A1 | 8/2001 |
| EP | 1 146 182 A2 | 10/2001 |
| EP | 1 349 995 A1 | 10/2003 |
| EP | 1 851 020 | 8/2006 |
| EP | 1 754 582 A1 | 2/2007 |
| EP | 1 349 995 B1 | 1/2008 |
| FR | 2 810 060 A1 | 12/2001 |
| JP | 6-146553 A | 5/1994 |
| WO | WO 94/26999 A1 | 11/1994 |
| WO | WO 96/27721 A1 | 9/1996 |
| WO | WO 99/66151 A1 | 12/1999 |
| WO | WO 99/66152 A1 | 12/1999 |
| WO | WO 00/20705 A1 | 4/2000 |
| WO | WO 00/20706 A1 | 4/2000 |
| WO | WO 00/47841 A1 | 8/2000 |
| WO | WO 01/07729 A1 | 2/2001 |
| WO | WO 01/48331 A1 | 7/2001 |
| WO | WO 01/51732 A1 | 7/2001 |
| WO | WO 01/53628 A1 | 7/2001 |
| WO | WO 01/66876 A1 | 9/2001 |
| WO | WO 01/75247 A1 | 10/2001 |
| WO | WO 01/98604 | 12/2001 |
| WO | WO 02/055809 A1 | 7/2002 |
| WO | WO 02/055810 A1 | 7/2002 |
| WO | WO 02/060691 A1 | 8/2002 |
| WO | WO 03/012224 A1 | 2/2003 |
| WO | WO 03/016654 A1 | 2/2003 |
| WO | WO 03/083234 A1 | 10/2003 |
| WO | WO 2004/079130 A1 | 9/2004 |
| WO | WO 2004/085765 A1 | 10/2004 |
| WO | WO 2005/068747 A1 | 7/2005 |
| WO | WO 2006/043893 A1 | 4/2006 |
| WO | WO 2006/090287 A1 | 8/2006 |
| WO | WO 2006/103565 A2 | 10/2006 |
| WO | WO 2006/117229 A1 | 11/2006 |
| WO | WO 2007/019957 A1 | 2/2007 |
| WO | WO 2008/064692 A1 | 6/2008 |
| WO | WO 2010/015138 A1 | 2/2010 |

OTHER PUBLICATIONS

"What is Broaching Used for?", http://www.wisegeek.com/what-is-broaching-used-for.htm.
Laminate Flooring Tips (http://flooring.lifetips.com/cat/61734/laminate-flooring-tips/index.html). Copyright 2000. 12 pages.
Grönlund, Anders, *Träbearbetning*, 1986, ISBN 91-970513-2-2, pp. 16-23, published by Institutet for Trateknisk Forskning, Stockholm, Sweden, with Summary Translation.

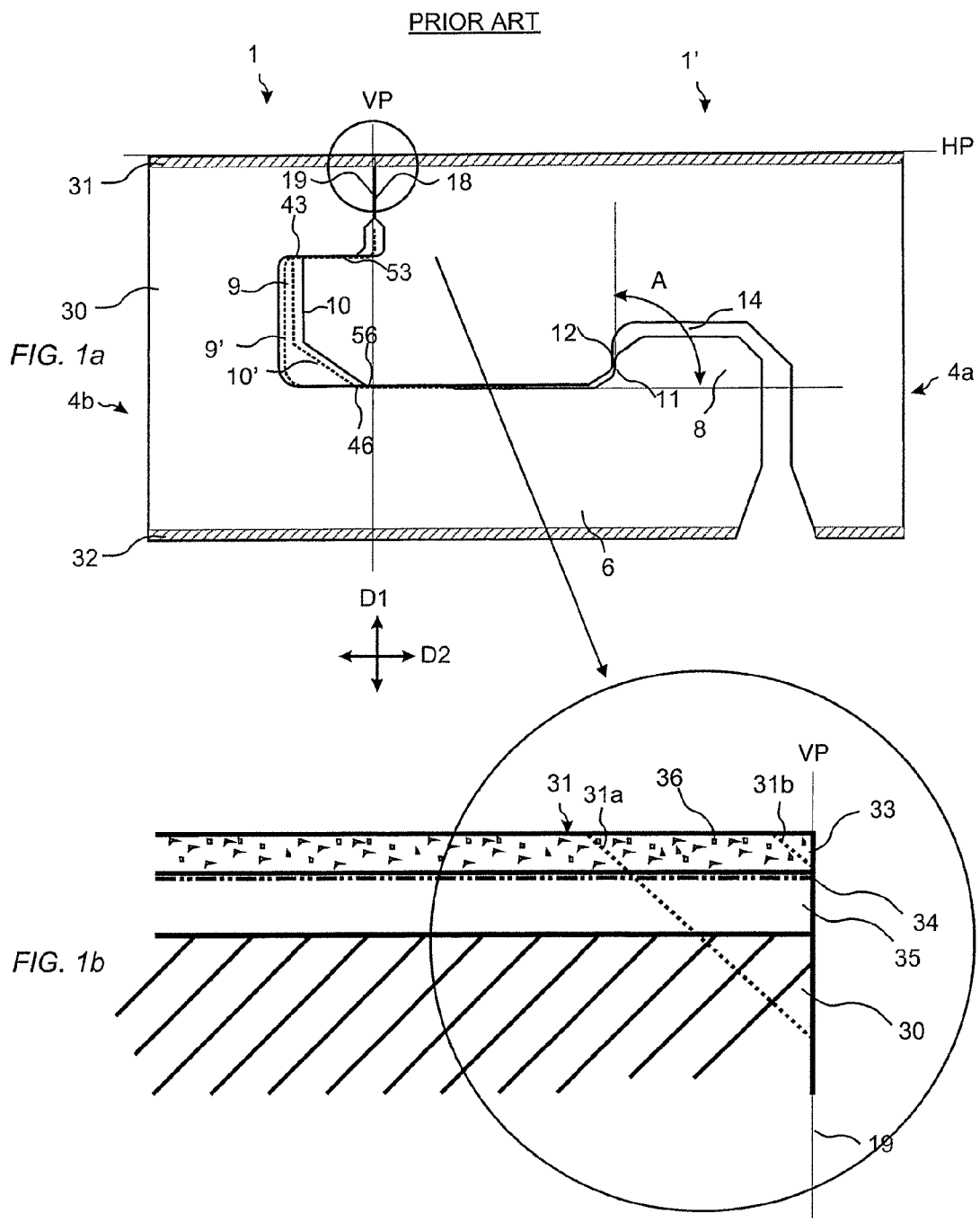

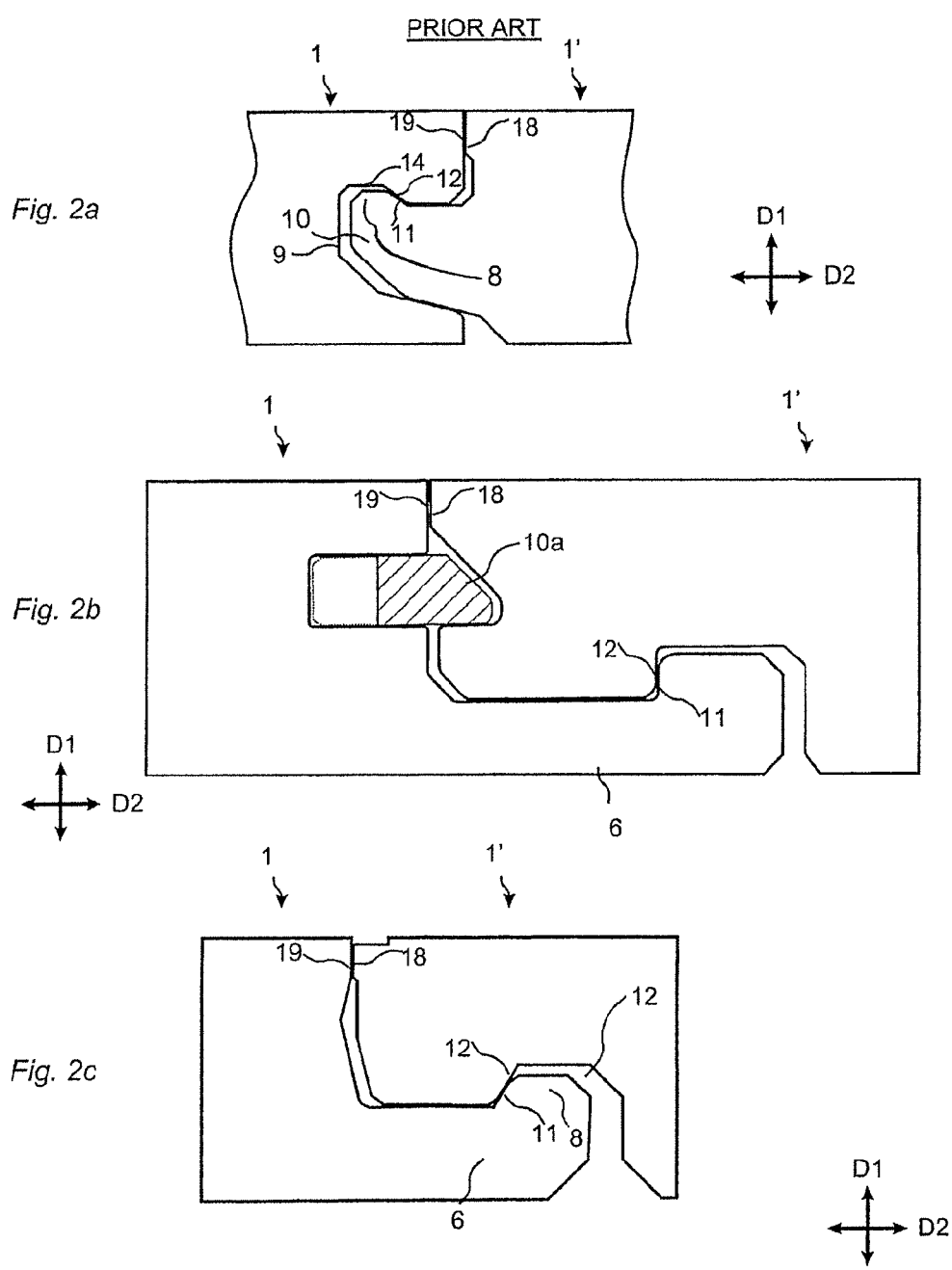

PRIOR ART

PRIOR ART

PRIOR ART

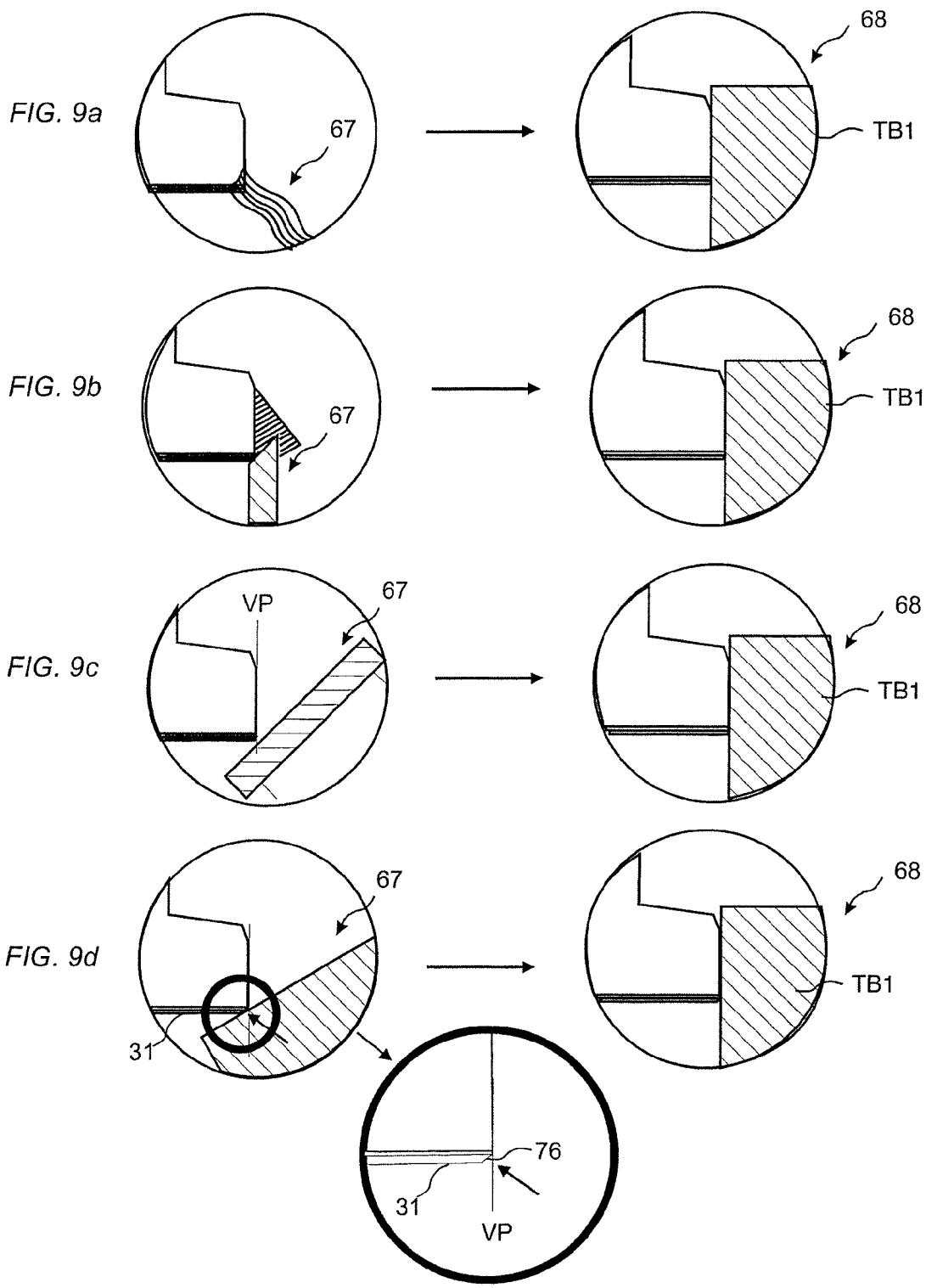

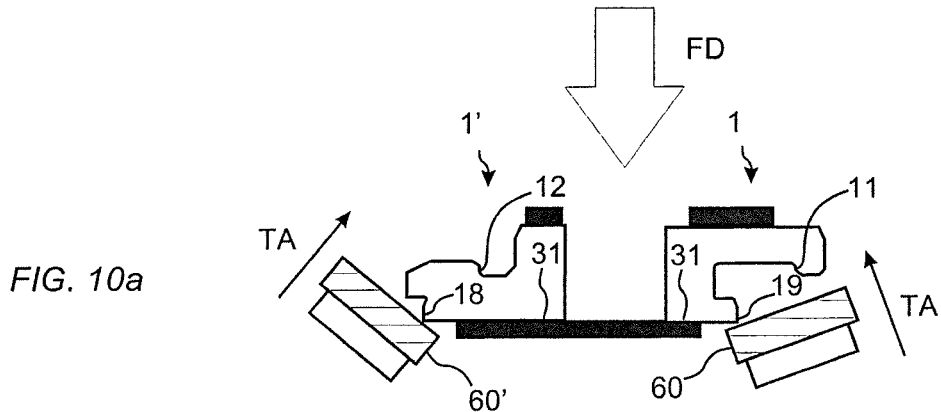
FIG. 10a
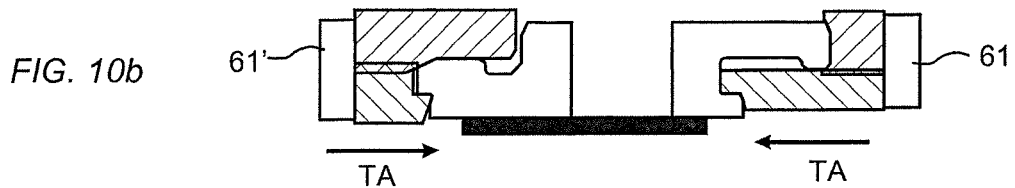
FIG. 10b
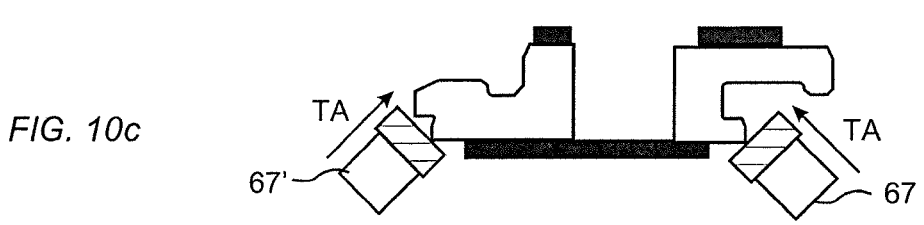
FIG. 10c
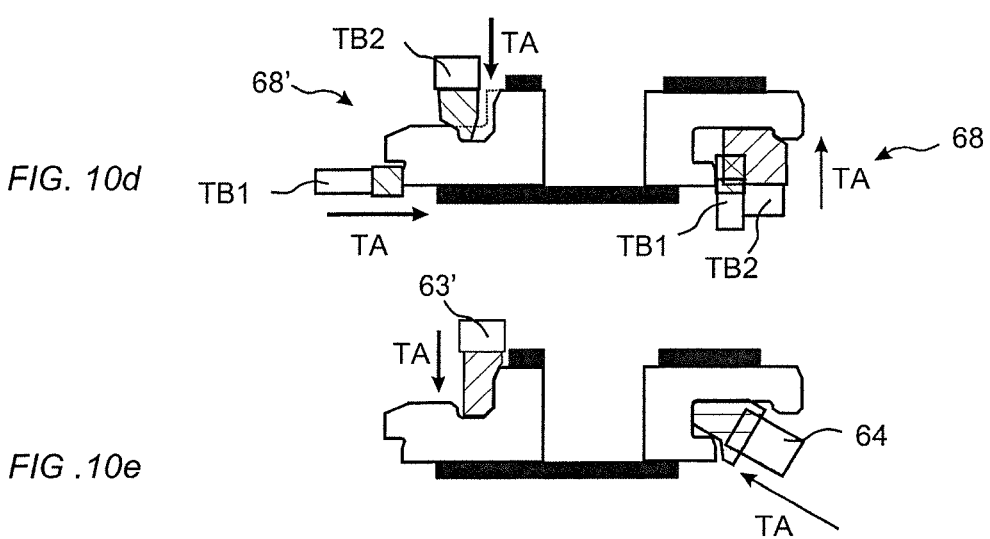
FIG. 10d
FIG. 10e

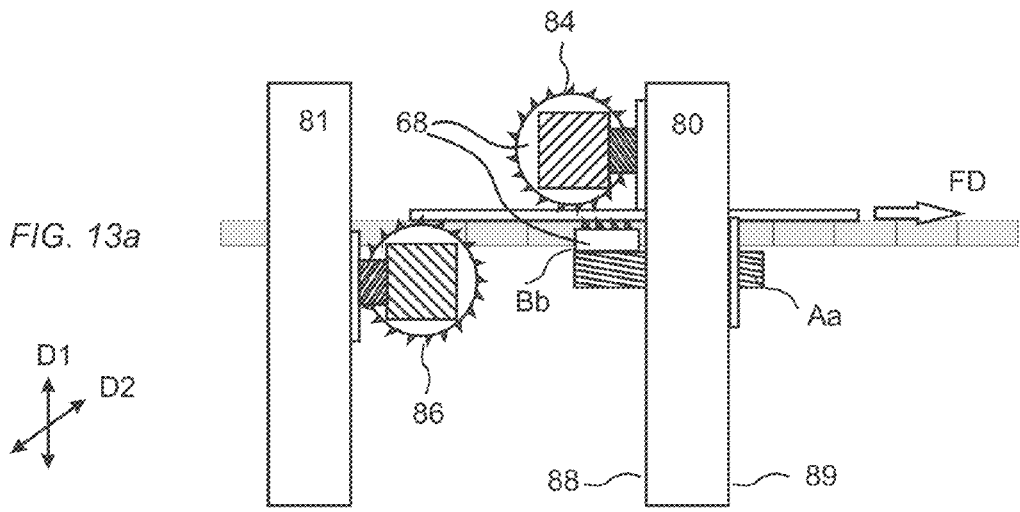
FIG. 13a
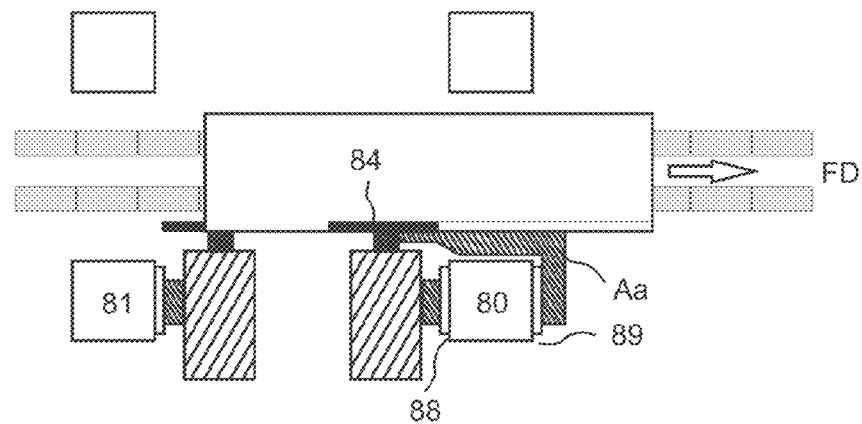
FIG. 13b
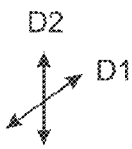

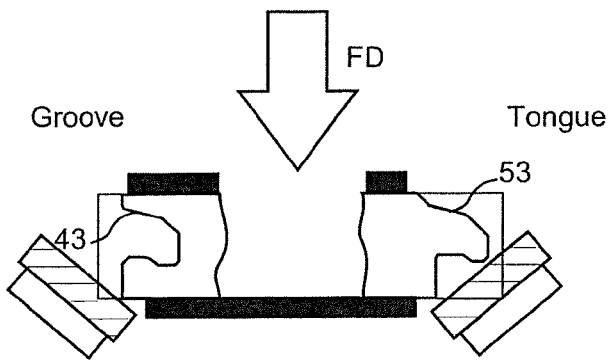
FIG. 17a
FIG. 17b
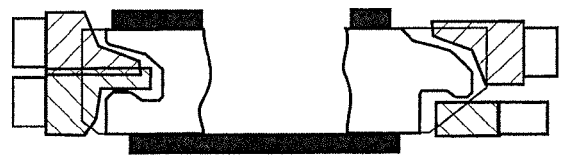
FIG. 17c
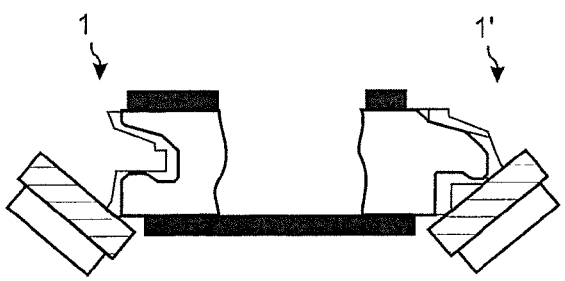
FIG. 17d
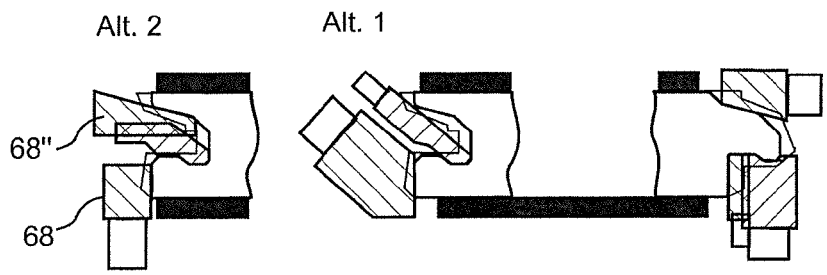
FIG. 17e
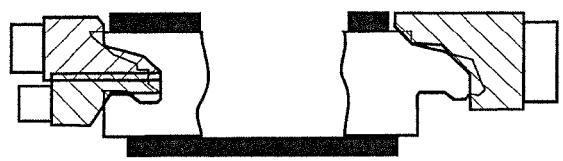

METHODS AND ARRANGEMENTS RELATING TO EDGE MACHINING OF BUILDING PANELS

CROSS REFERENCE TO RELATED APPLICATIONS

The present application is a continuation of U.S. application Ser. No. 12/832,754, filed on Jul. 8, 2010, which claims the benefit of U.S. Provisional Application No. 61/234,491, filed on Aug. 17, 2009, and the benefit of Swedish Application No. 0901054-7, filed on Jul. 31, 2009. The entire contents of each of U.S. application Ser. No. 12/832,754, U.S. Provisional Application No. 61/234,491, and Swedish Application No. 0901054-7 are hereby incorporated herein by reference in their entirety.

TECHNICAL FIELD

The present invention generally relates to the field of mechanical locking of floor panels. Specifically, the present invention relates to a tool configuration for producing improved locking systems for mechanical locking of floor panels comprising means for preprocessing the top surface layer of the floor panel as well as the method using such tool configuration. Further the present invention relates to an equipment for producing improved locking systems for mechanical locking of floor panels using a guiding device for guiding upper belt or chain as well as guiding the floor panel between two tool configurations.

FIELD OF THE APPLICATION

The present invention is particularly suited for use in floating floors with a mechanical locking system at the edges, having a wear resistant top surface layer, e.g. laminate floors with a surface layer of high pressure laminate or direct laminate, mineral granulate coated floorboards, wood fiber mix and the like. The following description of prior art technique, problems of known systems as well as objects and features of the invention will therefore as non-limiting examples be aimed mainly at this field of application and to the profiling of mechanical locking systems on long edges. However, it should be emphasized that the invention can be used in any floor panels or wall panels, which have a wear resistant top surface layer and are intended to be joined by means of a mechanical locking system. A traditional wooden floor or wall panel can for instance make use of the invention when it is coated with a wear layer comprising wear resistant particles. The invention can be used to form long and/or short edges, square panels and panels with more than four edges.

DEFINITION OF SOME TERMS

In the following text, the visible surface of the installed floor panel is called "front side", while the opposite side of the floor panel facing the subfloor is called "rear side". "Horizontal plane" relates to a plane, which is parallel to the front side. Directly adjoining upper parts of two neighboring joint edges of two joined floor panels together define a "vertical plane" perpendicular to the horizontal plane. The outer parts of the floor panel at the edge of the floor panel between the front side and the rear side are called "joint edge". As a rule, the joint edge has several "joint surfaces" which can be vertical, horizontal, angled, rounded, beveled etc. These joint surfaces exist on different materials, for instance laminate, fiberboard, wood, plastic, metal (in particular aluminum) or sealing materials.

By "locking" or "locking system" are meant cooperating connecting means which interconnect the floor panels vertically and/or horizontally. By "mechanical locking system" is meant that locking can take place without glue. Mechanical locking systems can in many cases also be joined by glue.

By "vertical locking" is meant locking parallel to the vertical plane and by "horizontal locking" is meant locking parallel to the horizontal plane.

By "vertical locking surfaces" is meant the upper and lower cooperating tongue surfaces in the tongue in a first edge cooperating with upper and lower cooperating tongue groove surfaces in the tongue groove in an adjacent second edge locking the adjacent edges vertically.

By "horizontal locking surfaces" is meant an essentially vertical upper tongue groove edge and a locking element in the second edge cooperating with an essentially vertical upper tongue edge and a locking groove in the adjacent first edge, the cooperating horizontal locking surfaces lock the adjacent edges horizontally.

By "locking groove side" is meant the side of the floor panel in which part of the horizontal locking consists of a locking groove whose opening faces to the rear side. By "locking element side" is meant the side of the floor panel in which part of the horizontal locking consists of a locking element, which cooperates with the locking groove.

By "locking angle" is meant the angle of the locking surfaces of the horizontal locking relative to the horizontal plane. In the cases where the locking surfaces are curved, the locking angle is the tangent to the curve with the highest angle.

By "tool angle" is meant the angle of the plane in which a tool rotates.

By "decorative surface layer" is meant a surface layer, which is mainly intended to give the floor its decorative appearance. "Wear resistant surface layer" relates to a high abrasive surface layer, which is mainly adapted to improve the durability of the front side. This conclude in that a "decorative wear resistant surface layer" is a layer, which is intended to give the floor its decorative appearance as well as improve the durability of the front side. A surface layer is applied to the core.

A "ridge of the surface layer" relates to the part of the surface layer on the floor panel portions next to the joint edge, the portion of the surface layer following along the joint edge.

BACKGROUND OF THE INVENTION, PRIOR ART TECHNIQUE AND PROBLEMS THEREOF

To facilitate the understanding and description of the present invention as well as the knowledge of the problems behind the invention, here follows a description of both the basic construction and the function of floor panels with reference to FIGS. 1-6 in the accompanying drawings. This basic construction and function is also completely or in parts used in the present invention.

A mechanical locking system comprises a tongue and a tongue groove for vertical locking and a locking element and a locking groove for horizontal locking. It has at least four pairs of active cooperating locking surfaces, two pairs for vertical locking and two pairs for horizontal locking. The locking system comprises several other surfaces, which generally are not in contact with each other and can therefore be produced with considerably larger tolerance then the cooperating locking surfaces.

Laminate floorings are usually composed of a core consisting of a 6-9 mm fiberboard, a 0.20 mm thick upper surface layer and a lower balancing layer. The surface layer provides appearance and durability to the floor panels. The core provides stability and the balancing layer keeps the board level when the relative humidity (RH) varies during the year.

The mechanical locking systems are generally formed by machining the core of the board. Such machining must be very precise in order to ensure a high quality. It is especially important that the cooperating vertical and horizontal locking surfaces are formed with high precision in order to ensure easy installation and a precise fit between adjacent edges.

FIG. 1a illustrates according to prior art a mechanical locking system (strip lock), which can be locked with angling and which is widely used on the market. Such a locking system can also be designed to be locked with vertical or horizontal snapping. A vertical cross section of the floor panel is shown of a part of a long side 4a of the floor panel 1', as well as a part of a long side 4b of an adjoining floor panel 1. The bodies of the floor panels 1, 1' can be composed of a fiberboard body or core 30, which supports here, a wear resistant and decorative surface layer 31 on its front side and a balancing layer 32 on its rear side (underside). The locking system has a tongue 10 and a tongue groove 9 which locks the panels in a vertical direction D1 with upper 53 and lower 56 tongue surfaces that cooperate with upper 43 and lower 46 tongue grooves surfaces. A strip 6 is formed from the body and balancing layer of the floor panel and supports a locking element 8 on a locking element side 1. Therefore the strip 6 and the locking element 8 in a way constitute an extension of the lower part of the tongue groove 46. The locking element 8 formed on the strip 6 has an operative locking element surface 11 which cooperates with an operative locking groove surface 12 in a locking groove 14 in the opposite locking groove side of the adjoining floor panel 1'. By the engagement between the horizontal operative locking surfaces 11, 12 a horizontal locking of the floor panels 1, 1' transversely of the joint edge (direction D2) is obtained if the panels are pulled apart. The locking angle A of the locking surfaces 11, 12 is in this shown embodiment 90 degrees and this gives a very strong horizontal locking. Locking systems are also formed with other locking angles for example 45-60 degrees. Some locking systems have a very low locking angle for example 30 degrees. Low locking angles makes it possible to make very compact locking systems and to save material. The locking strength of such systems is however very low. The upper part of the locking element side 1 comprise a first upper edge 19 and the upper part of the locking groove side 1' comprises a second upper edge 18 that are preventing a horizontal movement if the panels are pressed together.

FIG. 1b shows a laminate surface layer, which consist of a transparent overlay 33 with wear resistant particles of aluminum oxide 36, and a decorative paper layer 35 with a print 34 giving the surface its decorative properties. The print, which in most cases is a wood design, has generally a white base layer, which is not visible in a floor panel with straight and vertical upper edges. Some floor panels are formed with decorative bevels 31a, which are covered with paint or a decorative tape. It is also known that a part of the overlay 31b can be machined as a small bevel in order to make the edge softer and to remove edge chipping which can occur if the tools are not sharp. Such a machining of the overlay is made as a final step after the machining of the surface layer and the upper edge with processes similar to sanding operations.

A locking system (tongue lock) can also be formed without a strip 6 as shown in FIG. 2a. The locking element 8 is in this embodiment located on the tongue 10 and the locking groove 14 is formed as an undercut groove in the tongue groove 9.

A locking system can also be formed with a flexible tongue 10a (fold lock), which can be displaced during locking. Such a locking system, as shown in FIG. 2b, can be locked with a vertical movement D1.

A locking system (hook lock) can also be formed without a tongue, as shown in FIG. 2c, in order to lock only in the horizontal direction D2. Such a locking system is used on the short sides of narrow floor panels. The vertical locking is accomplished with the long sides of adjacent panels.

All of these known locking systems, which are used to lock panels horizontally, have two pairs of cooperating surface 18, 19 and 11, 12, which must match each other in a precise manner in order to work properly.

FIGS. 3a (side view) and 3b (top view) illustrate the most used method to produce a locking system and the main problems related to such production. The locking system is formed with the surface 31 of the floor panel pointing downwards. Several rotating tool configuration 60 are used to profile the edges when a floor panel 1, 1' is displaced horizontally in a linear feeding direction by a chain 70. A belt 70a supported by pressing wheels 70b is used to create a vertical pressure against the chain. The belt has no stability in the horizontal D2 direction perpendicularly to the feeding direction. The vertical D1 and horizontal position D2 of the floor panel is obtained by the chain, which moves with high precision in relation to the rotating tool configuration. The surface layer of the floor panel is fixed to the chain with friction.

FIG. 4a shows a floor panel, which is produced with a profiling equipment comprising one chain 70, and one belt 70a supported by pressing wheels 70b creates a vertical pressure against the chain. FIG. 4b shows that a perfect machining can form very precise grooves 14, locking elements 8 and upper edges 18, 19, which in theory are almost completely parallel. The production tolerances can be as low as +−0.02 mm. In practice, it is however very difficult to reach such tolerances. The reason is that the friction between the chain and the floor surface is not sufficient and the floor panel is moving or turning horizontally perpendicularly to the feeding direction during the production (hereafter referred to as horizontal turning). The belt, the chains, especially if they are not parallel, the tools and pressure shoes, which also are used (not shown), creates uncontrolled horizontal side pressures against the floor panel and the above mentioned parts of the locking system will not be formed completely parallel as shown in FIG. 4c. The distances L1, L2 between the upper part of the floor panel 18, 19 and the locking surfaces 11, 12 at one part of the panel can for example be 0.1-0.2 mm smaller than the corresponding distances L3, L4 at another part of the same panel. The locking can be to tight or to loose. The tongue 10 and the tongue groove 9 can also vary in the horizontal direction. Such tolerances 10', 9' as shown in FIG. 1a does not cause any problems however since the locking system is formed with spaces between the tip of the tongue and the inner part of the groove and such spaces are used to compensate the above mentioned production tolerances.

Several methods have been used to solve problems related to horizontal turning. The most used methods are to make the profiling equipment more stable with improved guiding of the chains. Cleaning devices are also used to clean the chain in order to maintain high friction between the chain and the floor panel. Special guiding devices GD as shown in FIG. 4a, such as steal rulers, which cooperate with special grooves on the rear side of the panel, have been used to prevent horizontal turning. Such rulers and grooves are difficult to adjust, they create wear and heat during production and can create stability problems when a balancing layer is separated by a groove.

All these efforts to improve the profiling equipment have however not solved the problems. On the contrary the problems of horizontal movement have increased over the years. One reason is that the production speed has increased and this creates stronger side pressure. Floor panels with smaller sizes, deep surface embossing and glossy surfaces have been developed and this decreases the friction between the chain and the floor surface and increases the risk for a considerable uncontrolled horizontal turning.

Other methods, which also have been introduced, are based on the principle to use tool design and tool positions to decrease horizontal turning. This is shown in FIGS. 5 and 6.

FIGS. 5a-5e show a traditional tool setup solutions for producing floor panels with a wear resistant top surface layer. The floor panel is moving in the feeding direction FD of the arrow during the profiling of the edges. The first step in the profiling line is illustrated in FIG. 5a and the last step in FIG. 5e. The cross section of floor panel 1, 1' is shown, positioned with the top surface layer 31 downwards on a ball bearing chain 70 in a milling machine. A traditional machining setup conveys the board 1, 1' with great accuracy past a number of independently rotating cutting tool configurations. The cutting tools have generally a tool diameter of approximately 200-250 mm and can be set at an optional tool angle TA to the horizontal plane HP of the board. The tools are mounted on opposite sides of several columns. The distance between the tools TD is about 0.5 m and the distance between the columns CD is about 1 m as shown in FIGS. 3a and 3b. Each tool 60-64, 60'-63' is dedicated to remove a limited part of the joint edge, where some are also forming the final joint surfaces. Several tools are positioned along both sides of the profiling line in the feeding direction FD of the floor panel 1, 1'. This is done in order to obtain sufficient production tolerances. A general rule is that an increase in number of tools result in improved production tolerances since each tool removes less material and creates lower forces that can displace the floor panel in an uncontrolled way. The normal production mode is to use 4-6 opposite tool pairs, on a first machine cutting the long side, followed by a similar machine cutting the short side locking system on the panel.

The horizontal locking surfaces 18, 19, 11, 12 are machined with four independent tools 62, 62' and 63, 63'. A horizontal turning between the third (FIG. 5c) and the fourth (FIG. 5d) tool stations on each side will create horizontal locking surfaces 18, 19, 11, 12 which are not parallel as shown in FIG. 4c.

Traditionally, when producing mechanical locking systems in a floor panel, rough cutting tools 60, 60', as illustrated in FIG. 5a, or the fine cutting tools 62, 62', as illustrated in FIG. 5c, are positioned at one independent profiling position on one side of the feeding direction FD of the floor panel 1, 1' and on the opposite side as opposite pairs. One tool of the pair is machining the locking element side 1, and the other tool is machining the locking groove side 1'. The rough cutting tools 60, 60' are removing the majority of the high abrasive material of the wear resistant surface layer in order to increase the lifetime and the cutting quality of the next coming tools, with the exception of tool 62, 62' that also cut in the wear resistant surface layer. The cutting edges of the tools consist of diamond, but even so, the running time of such a tool is limited, normally not more than 5 000-20 000 meters when cutting in a high abrasive top layer. Because of this, the tools that cut the surface layer, the rough cutting tools 60, 60', as illustrated in FIG. 5a, and the fine cutting tools 62, 62', as illustrated in FIG. 5c are configured with a straight cutting edge that can be stepwise moved M parallel to the cutting edge during production in order to bring a fresh tool cutting edge into a cutting position.

Such a horizontal rotation with a horizontal tool angle TA and a stepwise vertical adjustment M is shown in FIGS. 6a-6c. FIG. 6a shows the chip-removing surface 71 of the fine cutting tool 62 that is forming the top surface layer 31 of the floor panel 1. If the board have a wear resistant top surface layer the fine cutting tool is worn down much faster compared to cutting in the core of the board, e.g. high density fiber board (HDF). The result is a worn down portion of the cutting surface 72 as shown in FIG. 6b on the tool 62, which results in so-called chipping of the top edge portion of the panel 73, i.e. small cracks occur and the edge becomes rough and small white portions from the base layer of the print can show. FIG. 6c illustrates how the fine cutter 62 is moved in small steps in the vertical direction M some few tenth of a millimeter, so that a fresh cutting portion 71 of the tool 62 is in position against the top surface 31. A similar principle is used for the rough cutters and the stepwise movement of the tools is done while the machine is running in order not to lose running time in the line.

The rough cutting tools 60, 60' in FIG. 5a are generally positioned with a distance ED of approximately 0.5 mm from the vertical plane VP and from the final upper edge 18, 19. All next coming cutting tools, except the fine cutter 62, 62' are all designed such that their cutting teeth will keep a safe distance to the surface layer in the upper edge in order to avoid the risk of cutting into the wear resistant surface layer 31 and thereby avoid that they wear down fast, especially since these tools cannot be moved stepwise.

The horizontal turning inside the profiling machine is to a large extent related to the fact that the tools create uncontrolled side pressures on the panels. Such side pressures can occur if tools work with different tool angles, different rotations (with or against the feeding direction) or if they remove different amounts of material or material with different composition (core, surface layer).

The boards 1, 1' are generally more unstable and the risk for horizontal turning is high in the first and the last cutting position, relative to the other tool positions due to several reasons. For example the board is only clamped by the chain and the belt over a limited length and the inlet/outlet equipment may push the boards slightly.

The machining of the cooperating horizontal locking surfaces 11, 12, 18, 19 are therefore generally positioned at the inner tool positions in conjunction to each other. They are formed by fine cutters 62, 62' in FIG. 5c and locking groove cutter 63', locking element cutter 63 in FIG. 5d. The fine cutters 62, 62' in FIG. 5c are generally always positioned after the tools that forms the tongue and the tongue groove as shown in FIG. 5b. This is a major advantage since a majority of the material is already removed by the previous tools 60, 60', 61, 61' when the fine cutters start to remove material. The fine cutters 62, 62' must only remove a very limited amount of the core material and the last part of the wear resistant surface layer 31. This makes it possible to obtain tight machining tolerances, by reducing the cutting forces and the horizontal pressure on the floor panel.

The rough cutters 60, 60' and the fine cutters 62, 62' are as described above always separated with several tool positions in between. This causes a substantial uncontrolled horizontal turning between the rough cutters 60, 60' and the fine cutters 62, 62' and such turning can be about 0.2 mm. The rough cutters must therefore be positioned at a safe distance, generally at least 0.5 mm, from the final surface edge, in order to avoid quality problems such as chipped edges, white visible lines of décor paper and core exposure.

The locking surfaces of the locking groove 14 and locking element 8 are formed with rotating tool configuration 63, 63' having a tool angle TA equal or larger than the locking angle LA. A rotating tool configuration forming a locking surface with a locking angle A can never work with a tool angle TA which is lower than the locking angle A. This fact is a considerable limitation, which must be considered in the design and production of the locking systems.

The horizontal and vertical locking tools 61, 61', 63, 63' in FIGS. 5b and 5d are all examples of a rotating tool configurations consisting of two in relation to each other adjustable tool bodies TB1 and TB2 mounted on the same shaft. Such tools are hereafter referred to as COMBI tools. These COMBI tools are needed when the tool is forming a geometry, e.g. a groove, that consist of two opposite cutting surfaces with a fixed relative distance between each other. When the tool is sharpened, then some of the material of the tool is removed and the relative distance between the opposite edges is changed. The two bodies can therefore be adjusted to an oversize dimension and then be grinded into a correct relative dimension. A positive effect of these COMBI tools are that the accuracy between the two profiled surfaces formed by the two tool bodies is very accurate since it is profiled at the same position and with the same tool. Such COMBI tools 61, 61' can be used to improve the tolerances between a pair of the vertical locking surfaces of the tongue, as shown in FIG. 5b. COMBI tools are however not used to produce a pair of the horizontal locking surfaces. One reason is that the upper edge on the locking groove side must be formed with a tool body 62' having a tool angle which is different to the tool angle of the tool body 63' forming the locking surface in the locking groove as shown in FIGS. 5c and 5d. The tool bodies of a COMBI tool are always working with the same tool angle since they are fixed on the same shaft. Another reason is the fact that one of the tool bodies 62, which forms the upper edge, must work horizontally and must be adjustable stepwise vertically. A COMBI tool 63, 63' cannot be adjusted stepwise vertically since such an adjustment will at the same time change the position of the other tool body TB1 and TB2, which is used to form the locking surface of the locking element. A COMBI tool with two tool bodies on the same shaft has therefore two major limitations. Both tool bodies TB1, TB2 must work with the same tool angle and must be displaced in the same direction at the same time.

The main challenge while machining a mechanical locking system, apart from overall production cost, is to obtain sufficient production tolerances, i.e. to get a proper geometry of the joint and to do this in a cost efficient production mode. Accordingly, it would be highly desirable in the manufacturing of floor panels to reduce the horizontal locking tolerances further to a considerably lower level and in a more cost effective and easy way.

SUMMARY OF THE INVENTION AND OBJECTS THEREOF

The main objective of this invention is to provide solutions to problems related to horizontal turning of floor panels during machining of a mechanical locking system and especially during machining parts of the mechanical locking system, which are used to obtain the horizontal locking.

A specific objective is to counteract or eliminate horizontal turning and/or to reduce the negative effects of such horizontal turning during the production of floor panels, especially in floor panels having a wear resistant top surface layer similar to laminate floorings.

Another objective of one exemplary embodiment of the invention is to keep the production cost down with improved tool running time as the down time in the profiling line is decreased due to less tool changes.

The objective have been reached and the problem has been solved with a first principle which is based on a production method where the tools that form the horizontal locking surfaces are combined to one tool configuration on the same side of a column having two opposite column sides. This can eliminate substantially all horizontal turning between the tools in the tool configuration. This type of machining creates however a high wear on the tool that forms the wear resistant surface layer and it is not possible to increase the life time of such a tool with a stepwise adjustment during production. Thereby a preprocessing step is introduced preprocessing at least a part of the wear resistant top surface layer of the floor panel on the first upper edge such that properties of the surface layer are changed.

The problem has been solved with a second principle where the combined tool set at least on the locking element side is a rotating tool configuration where the same tool shaft drives at least two tool bodies, which can be individually adjusted in relation to each other. Such a rotating tool configuration can only work with a substantially vertical tool angle or at least with a tool angle which is equal or larger than the locking angle of the locking surface. This type of machining creates however a high wear on the tool that forms the wear resistant surface layer and it is not possible to increase the life time of such a tool with a stepwise adjustment during production. Instead the preprocessing step is introduced changing the properties of the surface layer.

The problem has therefore been solved with a third principle where an intermediate preprocessing step of the surface layer is made prior to the forming of the horizontal locking surfaces. Such intermediate preprocessing which removes material or changes the material properties, can be made with several methods and even with traditional rough cutters, which are positioned very close to the final edge of the top surface layer and in a position close to the fine cutters. The intermediate preprocessing is however preferably made such that a ridge defined as a part of the wear resistant surface layer beyond the vertical plane and inwardly, is removed. This special type of intermediate preprocessing makes it possible to avoid a high wear on a rotating tool configuration that works essentially vertically and to avoid horizontal turning between the intermediate preprocessing tool and the rotating tool configuration.

All of these three principles can be used independently in order to improve machining of mechanical locking systems. The best result is however reached if they are combined.

According to a first aspect of the invention, a method for producing mechanical locking systems in opposite edges of a floor panel is provided using a first tool configuration in a first edge. The floor panel has a wear resistant top surface layer, a core and mechanical locking systems on the first and second edge for horizontal locking of the panel with similar other panels. The mechanical locking system comprises a first pair of locking surfaces in the first edge of a panel and a second pair of locking surfaces in the opposite second edge. The first pair of locking surfaces comprises a first upper edge and a locking element. The second pair of locking surfaces comprises a second upper edge and a locking groove. The floor panel is displaced in a feeding direction with its first edge relative a first tool configuration. The first tool configuration comprises a first and second tool body positioned on the same side of a column having two opposite column sides. The method comprises the step of:

Preprocessing at least a part of the wear resistant top surface layer of the floor panel on the first upper edge such that properties of the surface layer are changed.

Forming by the first and second tool body at least a part of the first pair of locking surfaces.

This method provides essentially improved tolerances on the locking groove side due to the use of a tool configuration with the two tool bodies on the same side of a column. Further improvements can be obtained if the locking groove side, or at least one of the pair locking surfaces on the groove side also is formed simultaneously by the same kind of tool on the opposite side of the panel.

An exemplary embodiment of the first aspect provides therefore a method for producing mechanical locking systems in opposite edges of a floor panel using a first tool configuration in a first edge and a second tool configuration in a second opposite edge. The floor panel has a wear resistant top surface layer, a core and mechanical locking systems on the first and the second edge for horizontal locking of the panel with similar other panels. The mechanical locking system comprises a first pair of locking surfaces in the first edge and a second pair of locking surfaces in the opposite second edge. The first pair of locking surfaces comprises a first upper edge and a locking element. The second pair of locking surfaces comprises a second upper edge and a locking groove. The floor panel is displaced in a feeding direction with its first edge relative a first tool configuration and with its second edge relative a second tool configuration. The first and the second tool configuration comprises both a first and second tool body which are engaged in the floor panel on the same side of a column, where each column having two opposite column sides. The method comprises:

Forming by the second tool configuration at least a part of at least one of the surfaces of the second pair of locking surfaces. This can also be combined with the following step then performed prior to the forming step:

Preprocessing at least a part of the wear resistant top surface layer of the floor panel on the second upper edge such that properties of the surface layer are changed.

The first and the second tool configurations should preferably be positioned essentially opposite each other transversally to the feeding direction. The tool configurations should preferably not be displaced along the feeding direction more than the average distance between the columns on the same side of the chain. The best result is obtained however if the tool configurations are located completely opposite each other perpendicular to the feeding direction which means that forming of the locking surfaces of the first and second edge will start and end at the same time.

This first aspect offers the advantages that a turning of a floor panel during production will not change the relative distance between the cooperating horizontal locking surfaces for two reasons. Firstly they are formed with a first and a second tool body, which are located on the same side of a column close to each other in the feeding direction or preferably in the same position and this eliminates turning between the tool bodies. Secondly the first and second tool configurations are also located essentially opposite each other transversally to the feeding direction and this eliminates turning between the tool configurations. The second preprocessing step which is an intermediate preprocessing step and which is made close to the first tool configuration and/or second tool configuration makes it possible to use a rotating tool configuration with a considerable life time.

The horizontal turning between the second preprocessing tool and the rotating tool configuration can be as small as 0.05 mm and lower and this makes it possible to remove almost all of the wear resistant layers without any quality problems since a second preprocessing tool can for example be used to remove the 0.5 mm of the surface that remains after a first preprocessing tool. Such a tool can even remove a part of the overlay inside the vertical plane.

According to an exemplary embodiment of the first aspect the method comprises furthermore:

That the intermediate step removes a part of a ridge of the wear resistant top surface layer.

Such a preprocessing will considerably increase the lifetime of the rotating tool configuration. The lifetime can be essentially longer than for conventional tools using conventional production methods.

The ridge can be removed by using a conventional rotating tool or a non-rotating scraping tool configuration, which comprises several teeth positioned along the feeding direction on a tool body.

Production tolerances related to horizontal turning can also be reduced if the first and/or the second pair of horizontal surfaces are formed with tool bodies which are positioned on one side of a column as close to each other as possible over and under each other or side by side. The tool bodies can comprise a combination of two rotating tool configurations, two scraping tool configurations or one rotating and one scraping tool configuration.

According to a second aspect of the invention, a tool configuration for producing mechanical locking systems in a floor panel is used. The floor panel has a wear resistant top surface layer, a core and mechanical locking systems on a first and second edge for horizontal locking of the floor panel with similar other panels. Further the mechanical locking system comprises a first pair of locking surfaces in the first edge of a panel and a second pair of locking surfaces in the opposite second edge, the first pair of locking surfaces comprises a first upper edge and a locking element, the second pair of locking surfaces comprises a second upper edge and a locking groove. The tool configuration comprising a first tool configuration 68, and the first tool configuration comprising a first and second tool body. The first tool configuration is positioned on the same side of a column having two opposite column sides. The tool configuration have means for preprocessing at least a part of the wear resistant top surface layer of the floor panel on the first upper edge such that properties of the surface layer are changed. The first and second tool body comprising means for forming at least a part of the first pair of locking surfaces. Horizontal turning can also be counteracted with a production method and equipment in which the lower chain is essentially used for the vertical guidance of the floor panel only. The horizontal guidance is contrary to know methods accomplished by an upper belt or chain.

According to a third aspect of the invention, equipment for producing mechanical locking systems in opposite edges of a floor panel is provided comprising a lower chain, an upper belt or chain and several tool configurations for forming the opposite edges. The floor panel is displaced in a feeding direction by the lower chain or the upper belt or chain with its decorative front side in contact with the lower chain. The lower chain is guided vertically and horizontally with a lower guiding device. The upper belt or chain is guided in a horizontal direction by an upper guiding device and configured such that it presses the floor panel vertically towards the lower chain. The guiding devices are configured such that a horizontal deviation from a straight feeding direction between two tool configurations is essentially equal or smaller of the upper belt or chain than the corresponding deviation of the lower chain.

Several advantages can be reached with production equipment where the horizontal guiding is essentially obtained by an upper chain or belt. The rear side of the floor panel, which is in contact with the belt or chain, can be formed with a surface, which can create a high friction. The belt or the upper chain can also have a high friction surface. Such a surface can even create some embossing of the rear side without any negative effect on the quality of the floor panel. A very strong connection between the upper belt or chain and the floor panel can be obtained independent of the surface structure of the decorative side, which is in contact with the lower chain. The equipment offers also the advantages that no additional guiding grooves are needed and that no separate adjustment of the guiding parts are required if the size of the panel or the locking system is changed.

The first, second and third aspects can be used independently or in combination in order to counteract or eliminate horizontal turning of floor panels during production.

BRIEF DESCRIPTION OF THE DRAWINGS

FIGS. 1a-1b is cross section of a floor panel illustrating a mechanical locking system and close up of a surface layer, known in the prior art.

FIGS. 2a-2c illustrate different types of mechanical locking systems, known in the prior art.

FIGS. 9a-9d are cross sections of exemplary embodiments of preprocessing steps, according to the invention.

FIGS. 10a-10e are cross sections of manufacturing steps incorporating an exemplary embodiment of how an improved locking system for mechanical locking of floor panels is manufactured, according to the invention.

FIGS. 13a-13b is a side and top view of an exemplary embodiment of a tool setup solution incorporating a preprocessing step, according to the invention.

FIGS. 17a-17e are cross sections of manufacturing steps incorporating an exemplary embodiment of how an improved locking system for mechanical locking of floor panels is manufactured, according to the invention.

DETAILED DESCRIPTION OF EMBODIMENTS

Figure 7A:
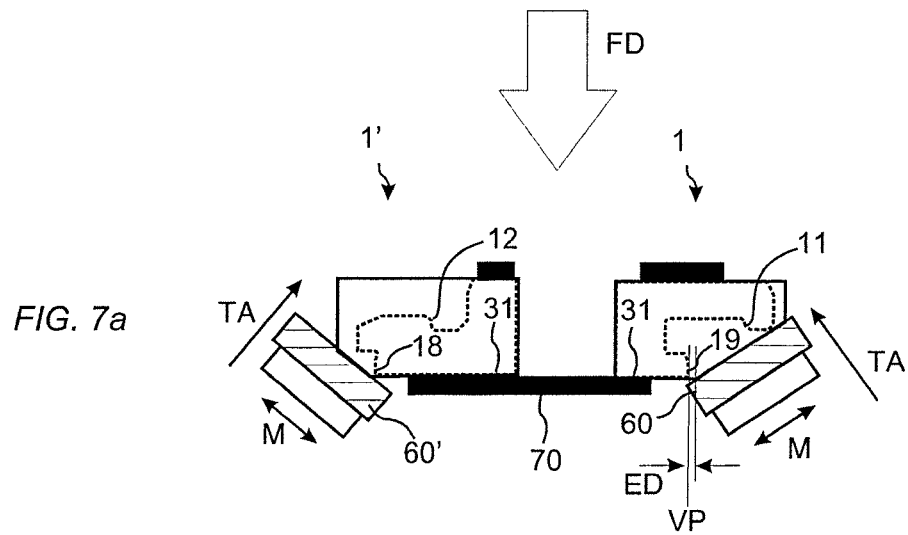
FIGS. 7a-7c are cross sections of manufacturing steps incorporating an exemplary embodiment of how an improved locking system for mechanical locking of floor panels is manufactured, according to the invention.
Figure 7B:
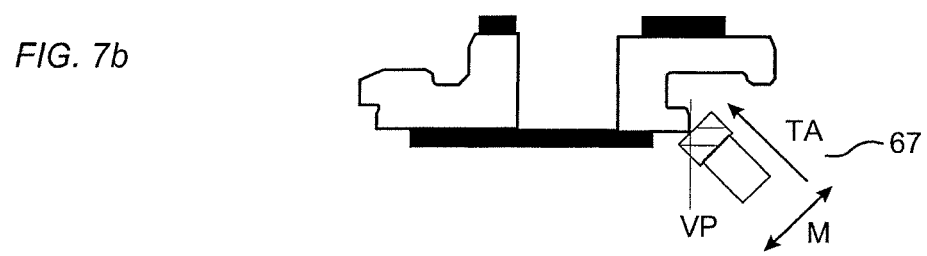
Figure 7C:
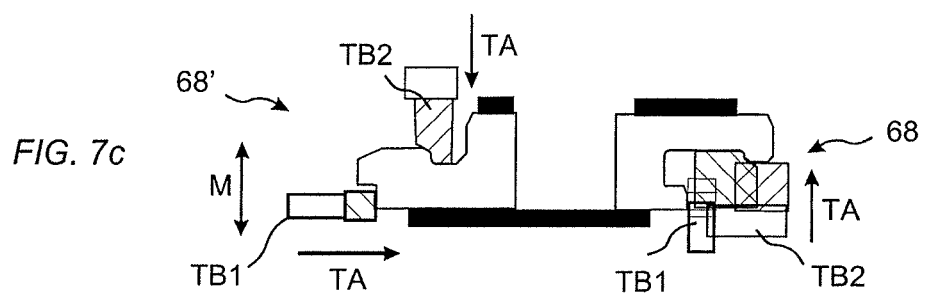

FIGS. 7a-7c is a profiling line illustrating exemplary embodiments of tool setup solutions for producing improved mechanical locking systems in a floor panel, according to the invention. The horizontal locking surfaces on the locking element side 1 are preprocessed in a first step with a pre-cutter 60 that removes the majority of the core and the surface adjacent to the vertical plane VP as shown in FIG. 7a. In conventional profiling it is normal to position the pre-cutter 60 with a distance ED of about 0.5 mm from the vertical plane VP. FIG. 7b is a tool setup solution of an intermediate preprocessing step, according to an exemplary embodiment that may be incorporated in the profiling line of the invention, the step wherein at least the majority of the wear resistant surface layer that remains after the first preprocessing step, see FIG. 7a, is removed. Such forming is very precise and can be made with very little force since a very small amount of material is removed, and the intermediate preprocessing tool configuration can be positioned very close to the next tool, which is forming the locking surfaces. For tool maintenance the pre-cutter 60, 60' and the intermediate preprocessing tool configuration 67 can be moved stepwise in a direction M parallel with the cutting edge, and this increases the lifetime of the tools considerably. FIG. 7c is a tool setup solution of a forming step, according to an exemplary embodiment that may be incorporated in the profiling line of the invention. The horizontal locking surfaces on the locking element side 1 are formed with a rotating tool configuration, i.e. a COMBI tool comprising two tool bodies. In the tool setup 68 a first tool body TB1 forming the first upper edge 19 and a second tool body TB2 forming the locking element 8 of the floor panel 1. This ensures that the intermediate position of the locking surfaces will always be correct independent of a horizontal turning of the panel during production. The COMBI tool has in this embodiment a 90 degrees tool angle TA against the floor surface and forms a locking surface on the locking element side 1, which has a locking angle LA of 90 degrees (see also FIGS. 20*a*-20*c*). The COMBI tool cannot be stepwise moved. The life time of the first tool body TB1 can however be as long as or even considerably longer than for conventional tool setup solutions, due to only a very small part of the surface layer which eventually remains after the intermediate preprocessing step is to be removed.

FIG. 7*c* shows that a tool configuration 68' with a first TB1 and a second TB2 tool body located vertically over each other on the same column can preferably be used to form the horizontal locking surfaces on the locking groove side 1'. An intermediate preprocessing step is not here necessary since the fine cutter TB1 can be moved stepwise vertically. It is however an advantage to use an intermediate preprocessing step in order to increase the life time of the fine cutter TB1 further, for example the same one as illustrated for locking element side 1, in FIG. 7*b*.

Figure 8A:
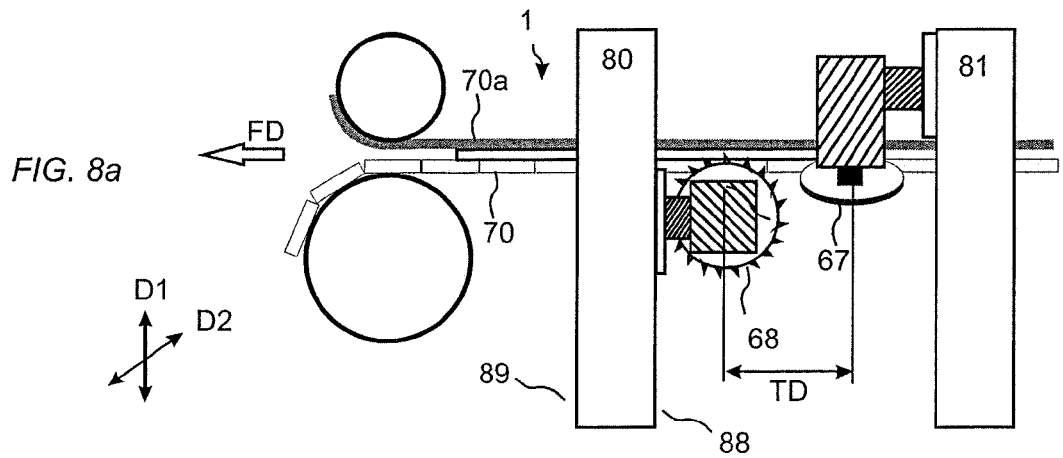
FIGS. 8a-8c are side views and a top view of parts of different profiling lines, illustrating a side and top view of exemplary embodiments of tool setup solutions as shown in FIGS. 7a-7c, according to the invention.
Figure 8B:
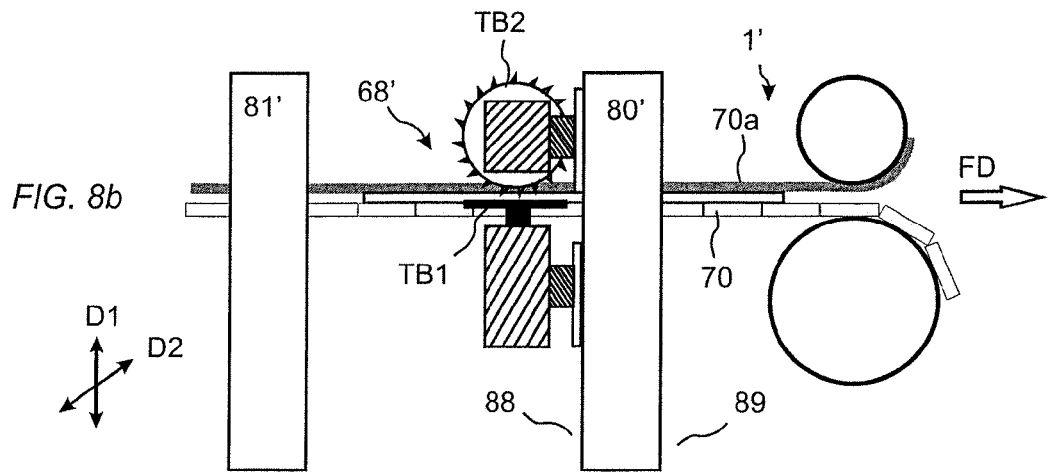
Figure 8C:
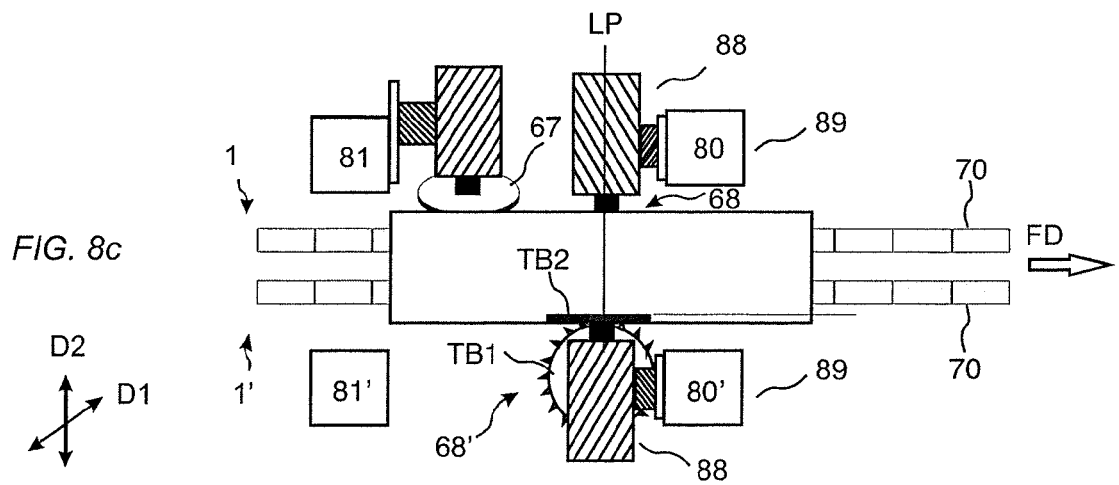

FIGS. 8*a*-8*c* are different views of a profiling line illustrating exemplary embodiments of tool setup solutions from FIGS. 7*a*-7*c* for producing improved mechanical locking systems in a floor panel, according to the invention. FIG. 8*a* is a side view of the locking element side 1. The intermediate preprocessing tool configuration 67 is positioned on a first column 81 and the COMBI tool 68 on an adjacent side of a second column 80. This result in that the tools are very close to each other and the horizontal turnings can be limited or nonexistent. The tool distance TD measured from one shaft center to the other shaft center can be less than the diameter of the largest tool for the best result in limiting the horizontal turning. This is equivalent to a distance TD of less than 240 mm with the traditional tools used today, compared to the commonly used distance TD of 400-500 mm in today's profiling machines. The tool distance TD can be even smaller if the tools are partly overlapping each other vertically. FIG. 8*b* is a side view of the locking groove side 1'. It shows a first TB1 and a second TB2 tool body that forms the upper edge and the locking surface of the locking groove. The tool bodies are positioned vertically over each other. This result in that horizontal turning that occurs will not change the relative distance between the pair of horizontal locking surfaces, see FIGS. 11*a*-*c*. FIG. 8*c* is a top view of the profiling line and shows that high quality horizontal locking surfaces can be formed with four rotating tool configurations positioned on three columns 80, 80', 81 and on three column sides. It is an advantage if the two tool configurations 68, 68' that forms the cooperating horizontal locking surfaces 11 and 19, 12 and 18 are located on each side of the chain opposite each other aligned essentially along a line LP perpendicular to the feeding direction. The forming of the cooperating locking surfaces will in such a tool configuration start and end at the same time and the effects of horizontal turning on the relative position of the cooperating horizontal surfaces can be completely eliminated.

FIGS. 9*a*-9*d* show exemplary embodiments of the preprocessing step as well as the intermediate preprocessing step, according to the invention. Heat, as one embodiment, FIG. 9*a*, will affect the properties of the surface layer so they are changed, for instance soften the wear resistant top surface layer. When the high abrasive particles, e.g. aluminum oxide, are not well fixed in a matrix, heating up the wear resistant top surface layer will reduce the wear resistance of the top surface layer. Heat can for example be introduced with IR (Infrared Radiation), just before the final profiling of the joint surfaces which is gathered at one tool station, in the profiling machine or even before the profiling line starts in the machine. Laser as another embodiment can also be used as means for heating since it is both efficient and can access the surface layer extremely close to the fine cutter. Heating can for example be done beside with laser, infrared lamps or hot air, with other methods, as a person skilled in the arts appreciates, as hot sliding shoe, microwaves and other known heating technologies or a combination of the same. The use of laser only for the purpose of heating instead of cutting will also ensure a very accurate wear reduction whereby the lifetime of the fine cutter will be longer. Another exemplary embodiment of an alternative preprocessing step according to the invention, is to add a lubricant e.g. wax on at least parts of the top surface layer of the floor panel. This will also change the properties of the surface layer. Heating or lubricating will be done essentially on a part of a ridge of the wear resistant top surface layer. FIG. 9*b* show a further exemplary embodiment of an alternative preprocessing step, according to the invention. A part of the decorative wear resistant top surface layer 31 is removed with a scraping tool and this result in that the properties of the surface layer are totally changed. FIG. 9*c* shows a preprocessing step with a preprocessing tool configuration 67 which is positioned essentially at the vertical plane VP, see also FIG. 1*b*. FIG. 9*d* shows a preprocessing tool configuration 67, which is positioned such that it removes a part of the wear resistant layer inside the vertical plane VP and forms a ridge 76 on the surface layer 31.

Figure 3A:
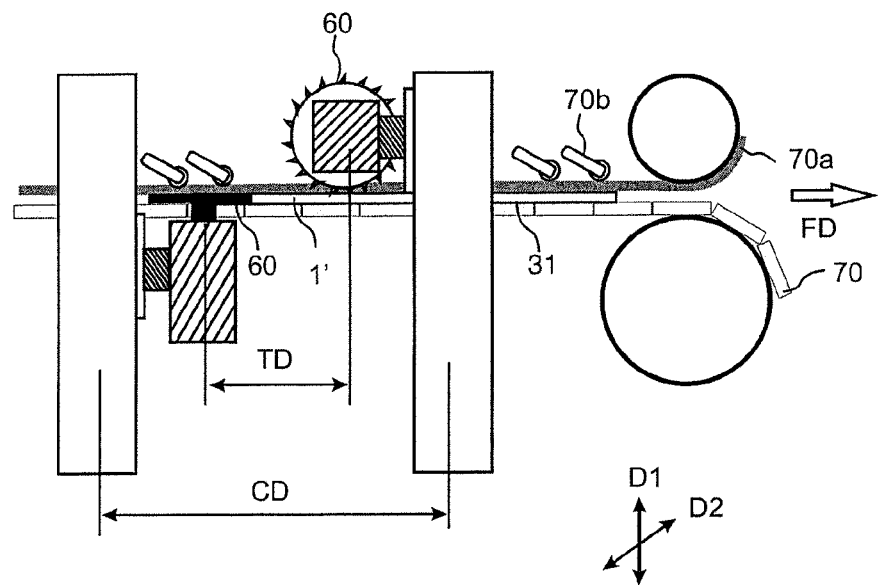
FIGS. 3a-3b is a side and top view of a traditional profiling line for producing floor panels with a wear resistant top surface layer, known in the prior art.
Figure 3B:
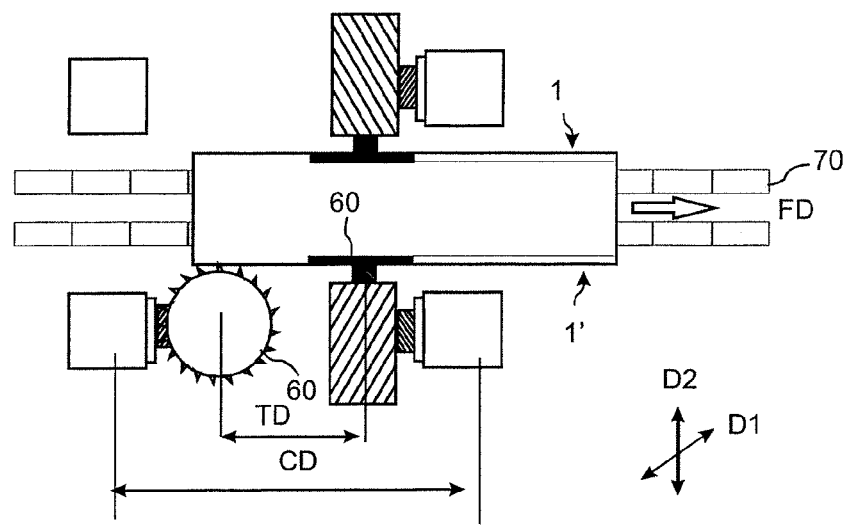
Figure 4A:
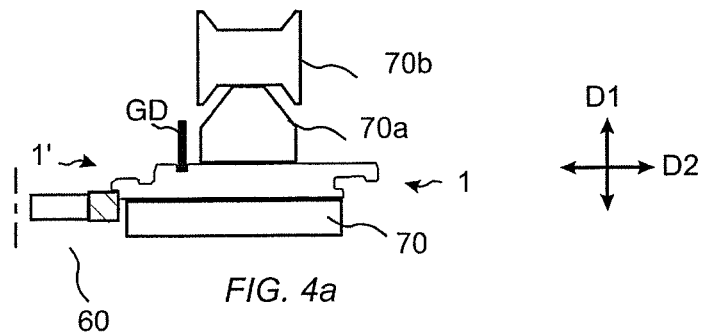
FIGS. 4a-4c is a cross section of a side view from the short side of the floor panel with a traditional profiling equipment, as well as a top view of the whole and side view from the short side, of the floor panel after machining, known in the prior art.
Figures 4B, 4C:
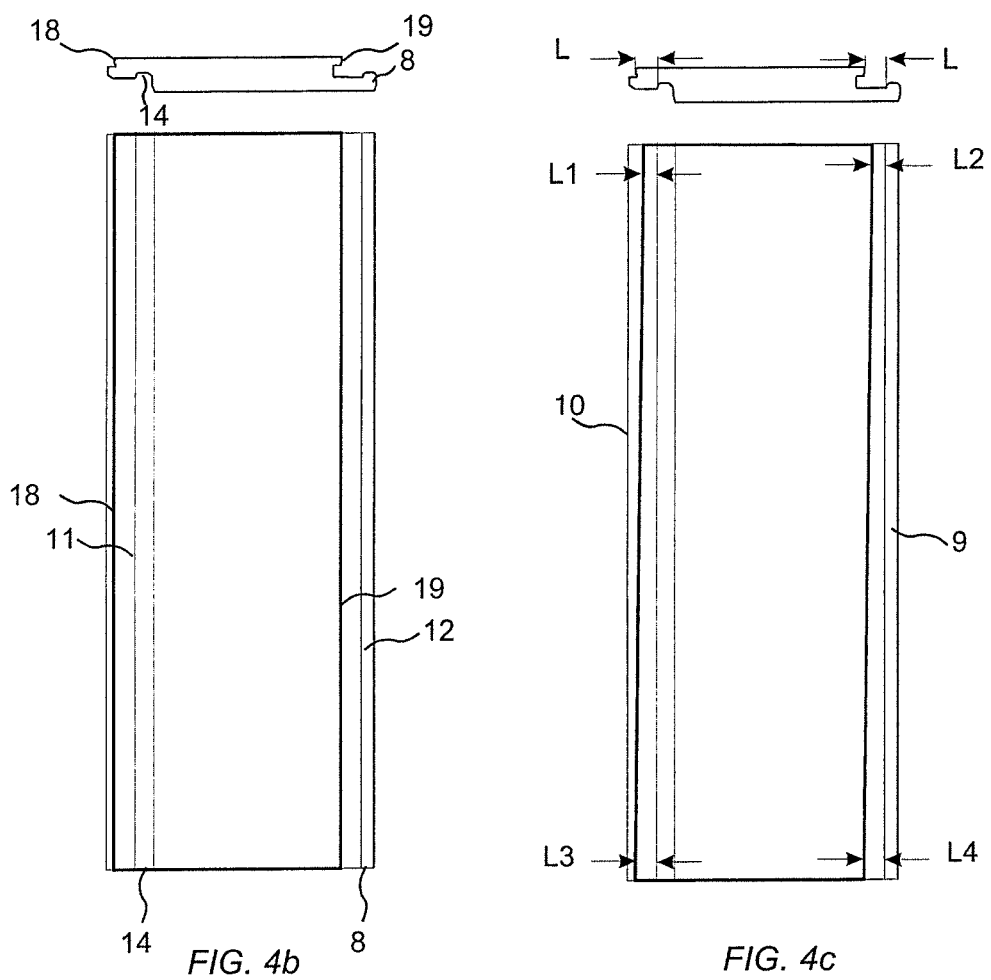
Figure 5A:
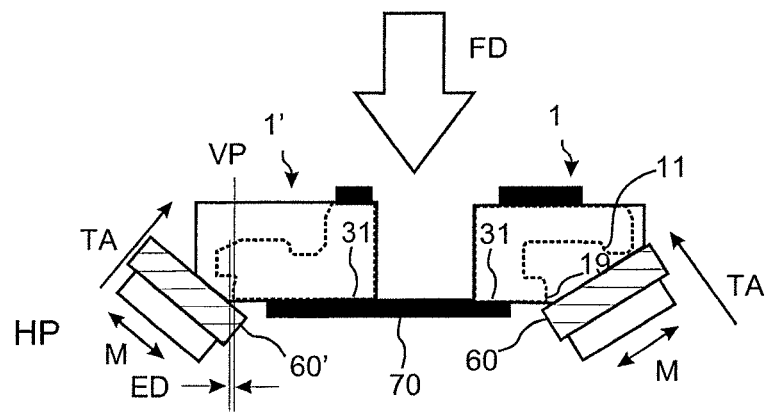
FIGS. 5a-5e are manufacturing steps producing a mechanical locking system in a floor panel, known in the prior art.
Figure 5B:
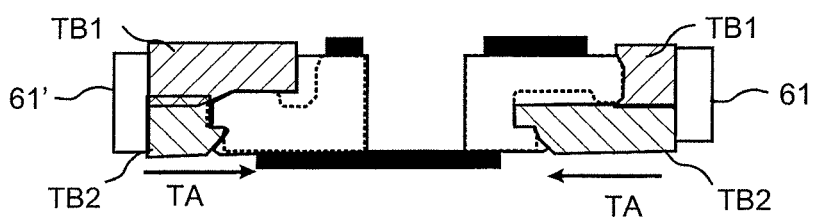
Figure 5C:
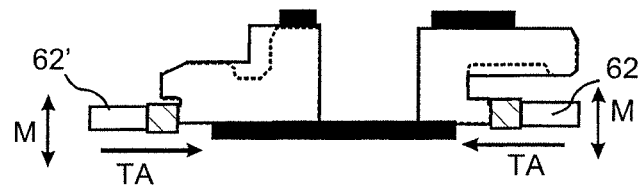
Figure 5D:
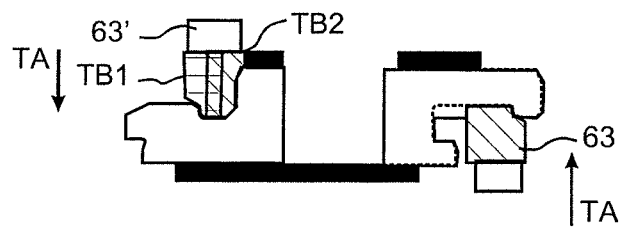
Figure 5E:
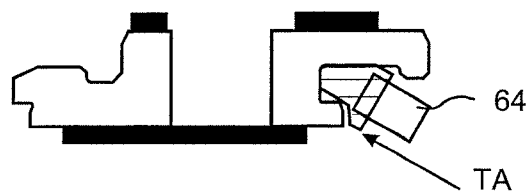
Figure 6A:
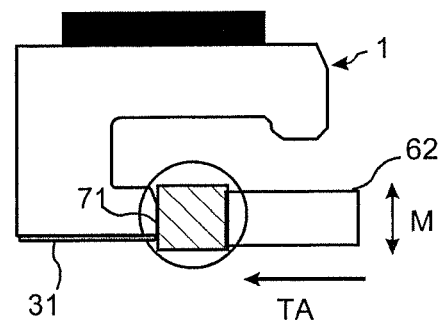
FIGS. 6a-6c is cross section of a tool cutting through the laminate layer, illustrating stepwise movements to improve running time of the tool, known in the prior art.
Figure 6B:
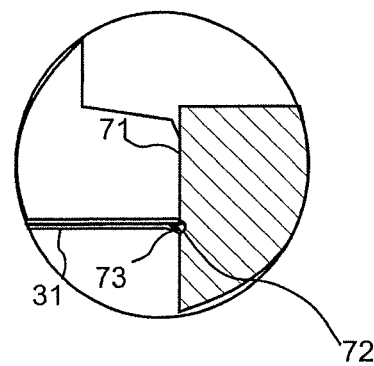
Figure 6C:
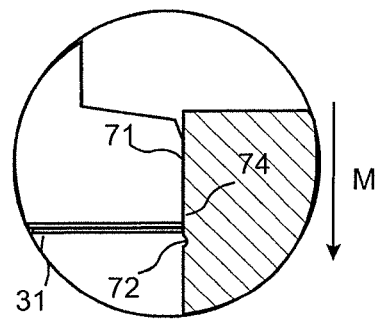

FIGS. 10*a*-10*e* is a profiling line illustrating exemplary embodiments of tool setup solutions for producing improved mechanical locking systems in a floor panel, incorporating an intermediate preprocessing step in the profiling line, on both opposite edges, according to the invention. An improved profiling accuracy for the mechanical locking system on the floor panels is obtained both on the locking element and the locking groove side and longer life time for the tools used in the profiling of the same. FIGS. 10*a*-10*b* are corresponding to FIGS. 5*a*-5*b* and are thereby not further described. FIG. 10*c* shows a tool setup solution, where an intermediate preprocessing is made with intermediate preprocessing tool configurations 67, 67' on the locking element side 1 and the locking groove side 1'. FIG. 10*d* shows a COMBI tool 68 on the locking element side 1 and a tool configuration with a first TB1 and second TB2 tool body on the locking groove side 1'. For example are the locking surface and a part of the locking groove formed by the second tool body TB2 in order to minimize the amount of material that is removed. This will increase the lifetime of the tool. This second tool body TB2 can also be designed as a rather simple scraping tool, which can be positioned on the same column side and above a rotating first tool body TB1. The remaining part of the locking groove where tight tolerances are not required, can be formed by another tool 63' as shown in FIG. 10*e*.

The tool setup solution with a preprocessing step and COMBI tool operating mainly in the vertical plane, according to an exemplary embodiment of the invention, can give an extra ordinary life time of the tools. Whereas a fine cutter in prior art without preprocessing, will run roughly 10 000-20 000 running meters before the tool need to be stepwise moved, tool configuration 68, 68' can operate over 500 000 running meters before the tool need to be re-sharpened. This in return will give a substantial benefit in down time in the profiling line due to changes of tools and also a noticeable effect on the risk of operator's mistakes while refitting a new tool. There are more positive effects than the tool life time, when cutting in the vertical plane. The traditional fine cutter working in the horizontal plane will create a waviness in the vertical contact surface 18, 19, in FIG. 1. This is a well-known phenomenon, which for instance is described in the prior art document WO 2006117229A1 or EP 1851020A1. The above mentioned fine cutter will solve this problem since the cutting edges of the teeth are moving entirely along the vertical pane parallel to the contact surface 18, 19 in FIG. 1, whereby no cutter waves can occur. This technology will be much more cost efficient than for instance the alternative laser technology.

Figure 11A:
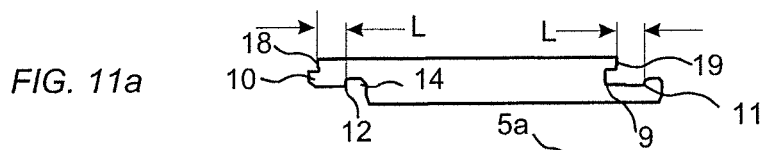
FIGS. 11a-11c is a side and top view of the whole floor panel produced by an exemplary embodiment of an improved manufacturing step, according to the invention.
Figure 11B:
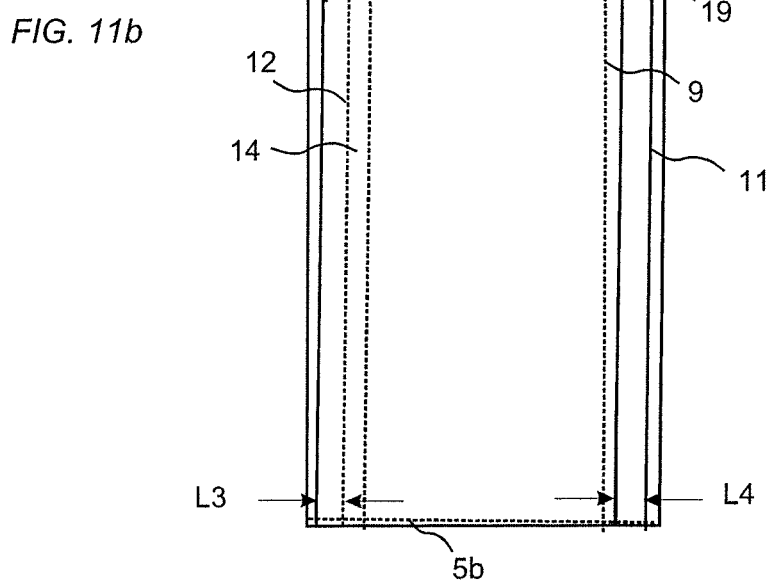
Figure 11C:
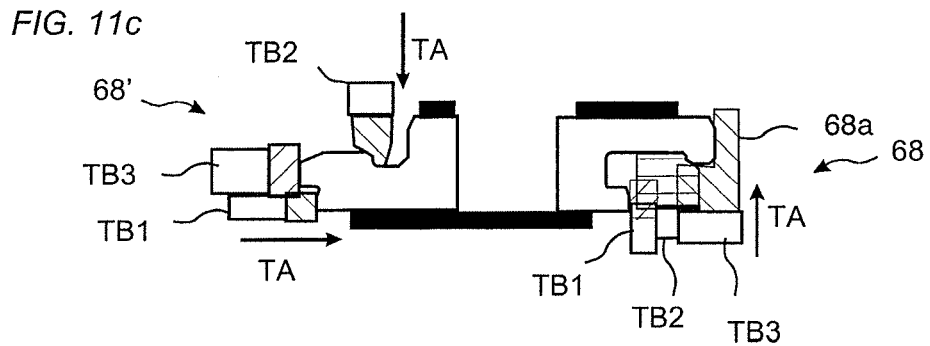

FIG. 11*a* shows that the above described production methods according to the invention will make it possible to form horizontal locking surfaces on opposite sides which are positioned at the same relative horizontal distance L1, L2, L3, and L4 from each other over the whole length of the floor panel even in the case when substantial horizontal turning takes place. A turning of for example 0.2 mm will be present in the tongue 10 and the tongue groove 9 but this will not influence the locking quality as explained before. Horizontal turning will change the shape of the upper edges such that they will not be completely perpendicular to the short edges 5*a*, 5*b*. This deviation will disappear when the short edges are formed since the upper edge is generally used as a base for the pushers that are used in the short edge profiling. This type of tolerance can easily be eliminated even in the case that the horizontal turning will result in a curved shape of the horizontal locking surfaces as long as the intermediate distance L is the same. Part of the tolerances will be removed in the short edge machining. The remaining tolerances of for example 0.1 mm will result in a banana shape which easily can be straightened automatically during installation since the locking element and the locking groove is formed with rounded guiding surfaces that automatically presses floor panels together and forms them to a straight line. The panels can of course also be pressed together slightly. All panels have a slight banana form even in the case that a perfect machining is made. FIG. 11*c* shows that the tool setup solution as shown in FIG. 10*d* according to an exemplary embodiment of the invention can be designed such that the strip of the tongue and the outer part of the strip is formed by for example a third tool body TB3 or by a part of a tooth 68*a* of the COMBI tool 68. Such machining will also eliminate the effects of the horizontal turning on the vertical locking means if necessary. This tool configuration can be used to form locking systems with adjacent surfaces, which have a precise fit, and no spaces are needed in order to compensate for production tolerances. This makes it possible to form tight and moisture resistant locking systems.

Figure 12A:
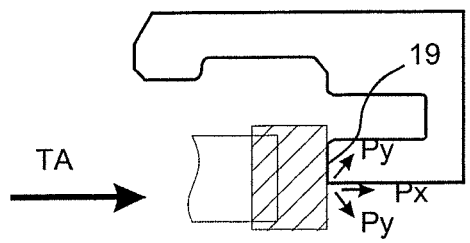
FIGS. 12a-12e are side views of a cross section of the groove side of a floor panel explaining the mechanism behind the COMBI tool setup solution and side views of a cross section explaining the turning direction of the COMBI tool setup solution, according to the invention.
Figure 12B:
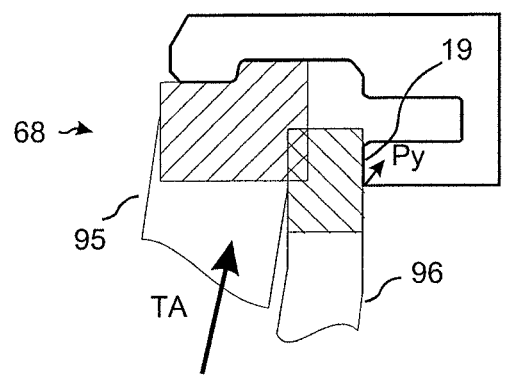

FIGS. 12*a*-12*e* show the direction of the cutting forces explaining the mechanism behind the COMBI tool setup solution 68 as shown in FIG. 7*c*, 8*a* or 10*d*. A fine cutter in prior art directs the cutting forces in direction Py-, Px- and Py-, visualized in FIG. 12*a*. Py-force is a clear risk of creating micro chippings as described above, since the outwardly directed force creates stress on the brittle surface layer having no support behind it. FIG. 12*b* show an exemplary embodiment of the tool setup solution of the forming step, according to the invention, disk 96 of the fine cutting tool 68, is mainly operating in the vertical plane and rotating in the feeding direction of the board, i.e. the operating teeth is moving in the same direction as the board, the feeding direction FD. Because of this there will be no forces Px- nor Py- that create micro chipping of the surface layer. The tool 68 can therefore be less sharp than what would be needed if there is a Py-force in the surface layer. If the tool 68 were to run in opposite direction, this would result in significant Py-force is created which would consequently reduce the running speed and lifetime of the tool drastically.

Figure 12C:
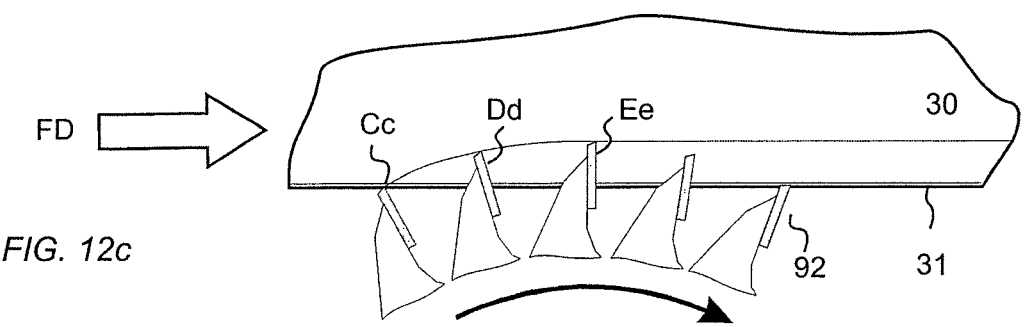

A second mechanism increasing the life time of the specific tool setup solution 68, in FIG. 12*b*, is the wear characteristics of the tool tip 92 of tool body 96 of the fine cutter in FIG. 12*c*. The outer tip portion Cc of the tool 68, will be the portion to first hit the high abrasive surface layer and remove material. The other of the cutting edge Dd positioned before Cc will cut only in the core 30. However when the tip Cc of the tool is worn down, it will be spaced slightly from the edge 18, 19, in FIG. 1, whereby the fresh portion of the cutting edge of the tip Cc will instead cut in the high abrasive surface layer. When this portion is worn down, then a new fresh cutting edge portion will cut and the tool will gradually wear down from the tip of the tongue until the tip is worn down until portion Ee. A way to maximize the lifetime of the tool is consequently to increase the distance from the tool tip portion Cc to Ee. Compared to a traditional fine cutter were you need to manually stepwise move the tool, this operation mode with working in the vertical plane with the tool will automatically position a fresh cutting edge in the high abrasive material once it gets worn down.

Figure 12D:
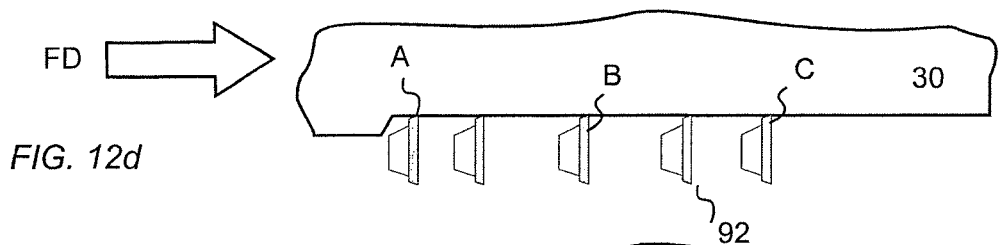
Figure 12E:
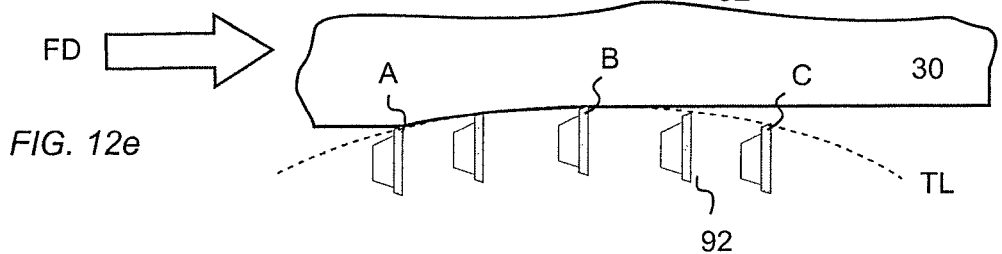

The turning direction of the rotating tool configuration 68' shall be against the feeding direction FD on the locking element side 1', when using the same principles as the COMBI tool 68, in FIG. 12*b*, on the locking groove side 1. This rotary direction ensures that the cutting forces are directed inwardly in the surface layer into the core, which is very important as described above. Two exemplary embodiments are shown in FIGS. 12*d* and 12*e*, where it is shown that the higher locking angle in the horizontal locking the higher tool angle is needed. It is even possible to use this method with a 90 degrees locking angle in the horizontal locking, if there is no tongue sticking out as in the locking system in FIG. 12*e*.

If the rotary fine cutting portion 96 in FIG. 12*b* would operate not completely in the vertical plane but slightly angled this would change the tool wear mechanisms of the fine cutting tool. This in return may have a positive effect on the lifetime of the tool in certain material, e.g. very brittle surfaces, which is extra sensitive to the sharpness of the tool. When rotating in the pure vertical plane without angling, the outer sharpest portion of tip of the tongue, between CC to Ee FIG. 12*c*, will remove the high abrasive surface layer. The movement of one tool tooth is illustrated in FIG. 12*d* with a view from above, were all removal of the surface layer will be carried out in position A, when the tool is new. The fresh edge portion of the tip will slide along the already cut surface layer edge ridge between position A and C. When the tool get worn, Point A will move closer to point B and finally end up at this point when the tool is worn down, as described above. The first point where the tool will start to cut, when the tool is worn will still be point A. If the material is sensitive to a worn cutting edge this might cause some micro chipping, even if a fresh cutting edge portion from the next coming tooth will remove some of this edge portion. FIG. 12*e* illustrates the teeth movement at the surface layer ridge due to the angle of the tool. With an angle, the tool tooth will cut along the complete edge from tool edge portion Cc to portion Ee, FIG. 12*c*, since the tooth will gradually move inwards in the board from point A to point B in the board, FIG. 12*e*, following the tool line TL. From point B until C it will have no contact any longer with the board.

If the rotary fine cutter 96 in FIG. 12*b* would be replaced with a scarping tool configuration and for example combined with a rotary tool configuration 95 or a scarping tool configuration, then scraping tool configuration 96 should preferably work in an inclined angle to direct the forces inwardly into the core.

If the rotary tool operates from the top on for instance the tongue side, then the turning direction need to be against the feeding direction FD in order to direct the forces in Py-direction.

FIGS. 13a-13b show a side and top view of an exemplary embodiment of a profiling line incorporating a preprocessing step, according to the invention.

FIGS. 13a-13b show a tool setup solution 68 having a second tool Aa, forming at least a part of the cooperating surfaces that locks the adjacent edges horizontally on either the locking element or locking groove side. The exemplary tool setup solution 68 is mounted on one side 89 of the column 80, but operating on the other side 88 of the column 80, i.e. in conjunction to the first tool Bb. As an example the tool setup comprises of a first rotating tool configuration and a second scraping tool configuration, or the rotating tool configuration might as well be a scraping tool configuration, a laser, a small end mill or any other tool that can remove material. Since the wear is so much reduced due to the preprocessing step, it can even be one tool body profiling both cooperating surfaces. As a person skilled in the art appreciates, it is still to be preferred to make stepwise movements on one part of that tool body, since the fine cutting tool part will in most cases cut small portions, in the high abrasive surface layer even if the wear has been reduced by the preprocessing step and may consequently wear down faster than the rest of the tool setup profiling only in the core. The second tool Aa can e.g. also be mounted on the second column 81 but operating on the same side 88 of column 80, if the two columns are close to each other.

The locking element and locking groove side may use a slightly varying tool setup solution but they are all based on the common principle of machining at least a part of the cooperating surfaces that locks the adjacent edges horizontally in the profiling machine, according to an exemplary embodiment of the invention. Preferably also with incorporating the principle of preprocessing. As a person skilled in the art appreciates, the principle of preprocessing according to the exemplary embodiments of the invention, can also be used in the production floor panels not having a wear resistant top surface layer, increasing the life time of the tool setup with a preprocessed operating surface for the tool setup.

Figure 14A:
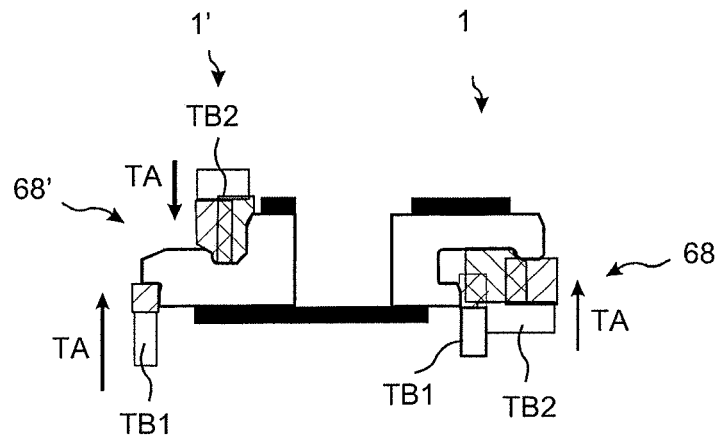
FIGS. 14a-14d are cross sections of a side view of exemplary embodiments of tool setup solutions, according to the invention.
Figure 14B:
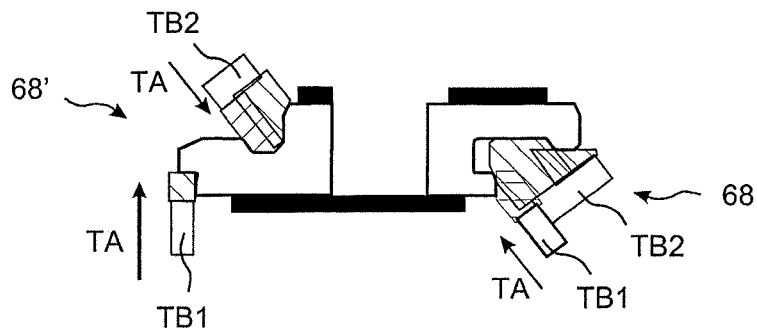
Figure 14C:
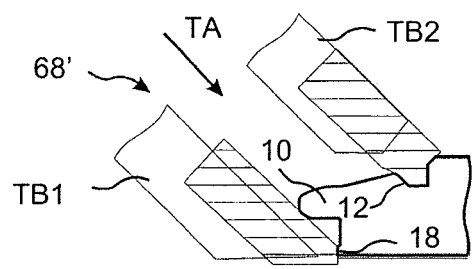
Figure 14D:
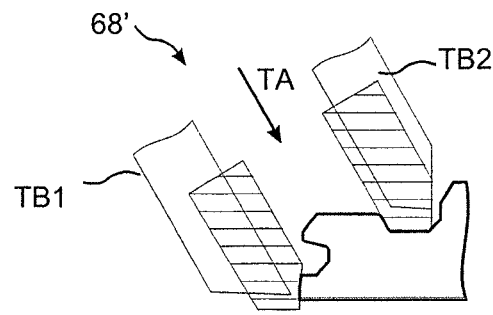

FIGS. 14a-14d show exemplary embodiments of tool configurations according to the invention. FIG. 14a shows that the tool 68' that forms the upper part 18 of the edge on the locking groove side 1' works vertically with a tool angle of 90 degrees against the surface layer. The function is the same as for the first tool body TB1 working in the upper part of the edge 19 on the locking element side 1 with the COMBI tool 68. FIG. 14b shows that the second tool body TB2 of the tool configuration 68' on the locking groove side 1' can work with a tool angle TA below 90 degrees. In this case the tool angle TA is equal to the locking angle LA (see also FIGS. 20a and 20d). The COMBI tool 68 has in this embodiment the same tool angle. FIGS. 14c and 14d show that a COMBI tool 68' with a first and second tool body TB1, TB2 positioned on the same shaft can be used to form the horizontal locking surfaces 12, 18 on the locking groove side 1'. The tool angle TA must be adapted to the locking angle LA of the locking surface 12 in the locking groove and the form of the tongue 10. Locking surfaces with up to 80 degrees and even more can be formed if the protruding part of the tongue is limited. FIG. 14d shows a locking system without a tongue and such locking system shown in FIG. 2b as well can both be formed with a 90 degrees tool angle. This locking system should preferably be formed with a tool configuration rotating against feeding direction in order to avoid chipping of the wear resistant surface layer by directing the cutting forces inwards towards the core.

Figure 15A:
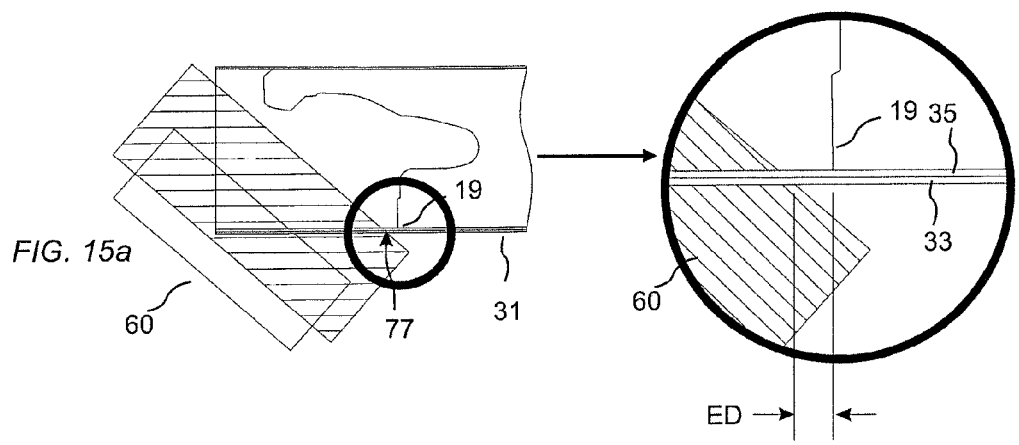
FIGS. 15a-15c is cross section of a side view of an exemplary embodiment of a preprocessing step, according to the invention.
Figure 15B:
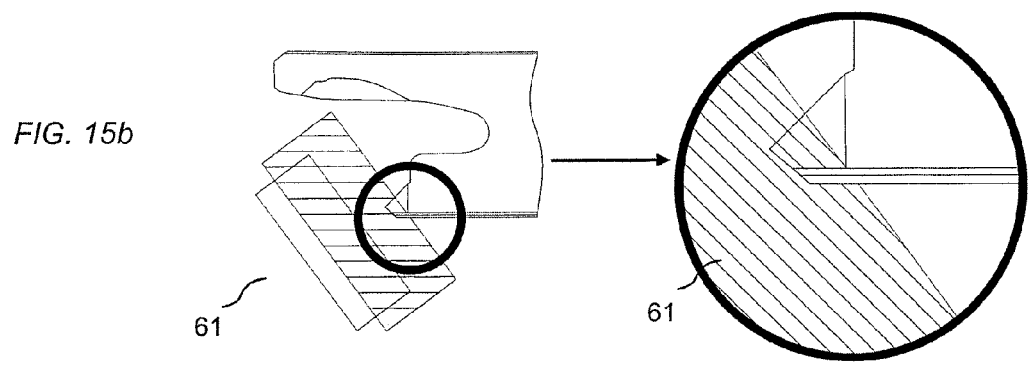
Figure 15C:
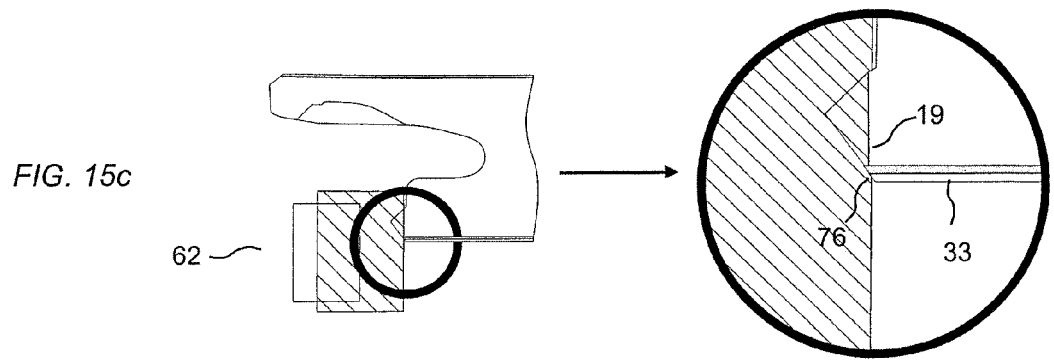

FIGS. 15a-15c illustrate an exemplary embodiment of a preprocessing step, as in FIG. 9d, of the wear resistant surface layer 31 using a rotating tool configuration, according to the invention. FIG. 15a shows the rough cutter 60 positioned at safe distance ED, e.g. 0.5 mm, from the final joint edge 19 in order to avoid a white line that will be the result if ED is smaller than the horizontal movement of the floor panel 1 between the rough cutter 60 and the fine cutter 62, whereby a small bevel is exposed in the white decor paper in the final floor panel. The preprocessing tool 61 can be positioned close to the joint edge 19, since the tool is placed in conjunction to the fine cutter 62, resulting in virtually no horizontal movement between the preprocessing tool 61 and the fine cutter 62. This, because the two tools are preferably placed in the middle of the machine were it is stable, as opposed to the rough cutter 60 being placed in the inlet of the profiling line. Further, the tools are separated with a very small distance and both tools remove a very limited amount of material creating a very limited side pressure.

The preprocessing tool 61 is preferably positioned such, in relation to the fine cutting tool 62, that their final result is a remaining small bevel 76 in the overlay 35, but not so deep that their final result is a bevel in the décor paper 35, which would create a white line. This bevel, hereinafter called a micro bevel, will create a smooth feeling of the ridge of the edge, removing the otherwise common problem with laminate floor having quite sharp edges. The sharp edges are a problem for the installer that may get a cut in the hands and also for the consumer with sometimes damaged stockings when walking on the floor.

The micro bevel will also maximize the lifetime of the fine cutting tool 62. It should however be emphasized that it is possible to position the preprocessing tool 61 slightly further out in order to avoid the micro bevel 76 if desired, for instance in dark decors were the micro bevel may show, and still get an acceptable lifetime of the fine cutting tool. By placing the preprocessing tool 61 approximately 0.1 mm outside the final joint edge 19, the amount of wear resistant surface material that the fine cutter have to remove compared to only using a rough cutter leaving 0.5 mm wear resistant material, will drastically be reduced.

Figure 16A:
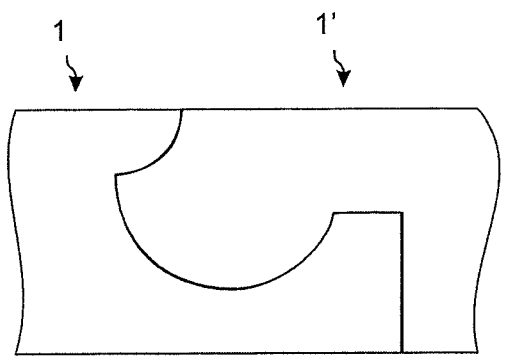
FIGS. 16a-16d are cross sections of a side view of different design of mechanical locking systems now possible to produce with exemplary embodiments of tool setup solutions, according to the invention.
Figure 16B:
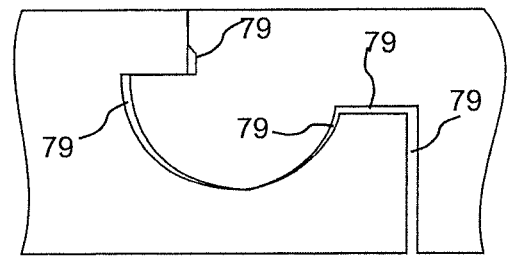
Figure 16C:
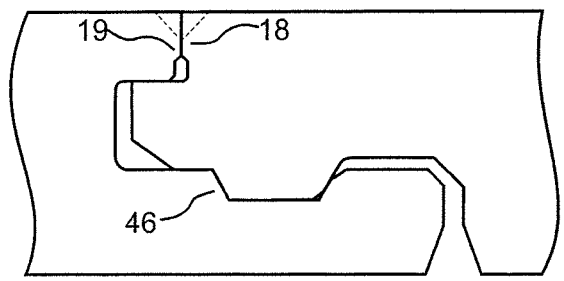
Figure 16D:
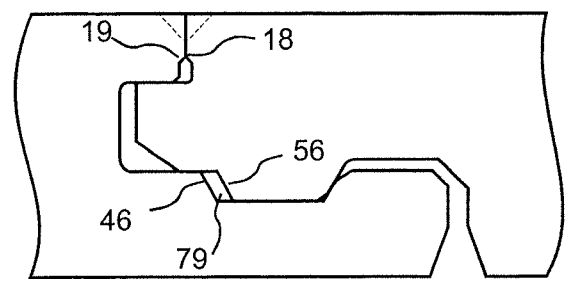

FIGS. 16a-16d illustrate design of mechanical locking systems that can be produced by the tool setup solutions, according to the invention. FIG. 16a and FIG. 16c show a mechanical locking system, according to prior art, with completely complementary surfaces in the tongue and groove side. However such systems has proven to be impossible to produce. The upper contact surface may in many cases be too small, causing damages on the upper contact surface when the boards are subject to forces that push the boards against each other. This may lead to creation of gaps that allow dirt and water to penetrate into the locking system. It may also cause the decorative upper surface to rise and the floor will lock badly. The upper surface will for instance be small in very thins board, e.g. 7 mm and below, or for board with bevels or were you need to make a large glue pocket 79, industry gaps 79, in FIG. 16b and FIG. 16d, were for instance a sealing device shall be mounted. The solution to this problem is to absorb the forces that push the boards together with a larger contact at another place in the locking profile, e.g. a protrusion on the locking strip, which fit with complementary surfaces on a recess on the lower side of the tongue. A space between the inner lower contact surface on the protrusion and the complementary surface on the tongue in order to absorb the production tolerances to make sure that this contact does not separate the upper contact surface of the board. However a solution would be a tool profiling both the recess and the upper contact surface on the locking groove side combined with a double engine setup on the locking element side, thus profiling all the critical horizontal surfaces at the same position. This makes a perfect fit and the majority of the inwardly directed forces are picked up in the recess thus protecting the upper contact surface. In practice the industry gaps 79, in FIG. 16*b* and FIG. 16*d*, have been inserted in the mechanical locking systems in order to absorb both vertical and horizontal movement of the floor panel 1, 1' between the tool setup solutions in the profiling line during production. For instance if gap 79, FIG. 16*d* was to be removed and traditional tool setup solutions were to be used there would be some movement between the tool cutting the 18,19 and 46,46, that would create a space between upper contact surface 18,19 when surface 46 would push out surface 56 and a visible gap would emerge. With a space there would be no push.

With the present invention it is possible to produce both surfaces 19 and 46 or 18 and 56 with one or two tools at the same profiling position. This would then eliminate the tolerances in the relative positions of the surfaces and not push out tendency would emerge. Thereby it is possible to remove gaps 79, in FIG. 16*b* and FIG. 16*d*. This generates extra strength in the joint for horizontal forces when the boards are pushed together. It can be extra beneficial to have this feature, no gap, in for instance soft core materials such as MDF, or when there is a reduced upper vertical contact surface due to for instance a deep bevel or when a big gap is needed above the tongue.

FIGS. 17*a*-17*e* illustrate exemplary embodiments of tool setup solutions for a locking system, where one contact surface 43, 53 constitute a vertical locking surface but also a horizontal locking surface for inwardly directed forces, according to the invention. As a person skilled in the art appreciates here only one contact surface is illustrated, but the principles described are naturally equally important if there are more than one.

FIG. 17*a* shows where the tool is removing the majority of the wear resistant material.

FIG. 17*b* shows where the tool is removing the majority of the core material in order to reduce the amount of material to be removed by the next coming tools.

FIG. 17*c* shows a preprocessing tool setup solution removing the majority of the remaining wear resistant material that the fine cutter shall remove in FIG. 17*d*. The preprocessing tool setup solution in FIG. 17*c* is positioned close to the fine cutter in FIG. 17*d*, and positioned in the middle of the profiling line close to the fine cutter.

FIG. 17*d* shows two alternative tool setup solutions for the groove side. Alt. 1 shows a rotary tool configuration, this setup surface 43 has to be profiled in next step shown in FIG. 17*e*. FIG. 17*e* shows a tool setup solution that is spaced apart from the tool setup solution in FIG. 17*d* and horizontal movements of the floor panel will occur, especially since this is an outer position where the floor panel is not always clamped well on the feeding chain. This movement will generate a varying vertical fit. If it becomes too loose, this can generate squeaking sound after installation and if it becomes too tight will make the installation harder.

Alt. 2 shows an alternative with a scraping tool 68" in combination with a rotating tool configuration 68. With this setup in FIG. 17*d* all vertical and horizontal surfaces are profiled at the same position. This is an important principle that the invention facilitates, which is extra beneficial for locking systems having surfaces that constitute both vertical and horizontal locking surface. As a person skilled in the art appreciates other exemplary mechanical locking systems are also applicable e.g. traditional strip locking systems as in FIG. 1, were the lower vertical contact surfaces 46, 56 has been removed and the angled locking surface 11, 12 are both a vertical and horizontal locking surface.

Figure 18A:
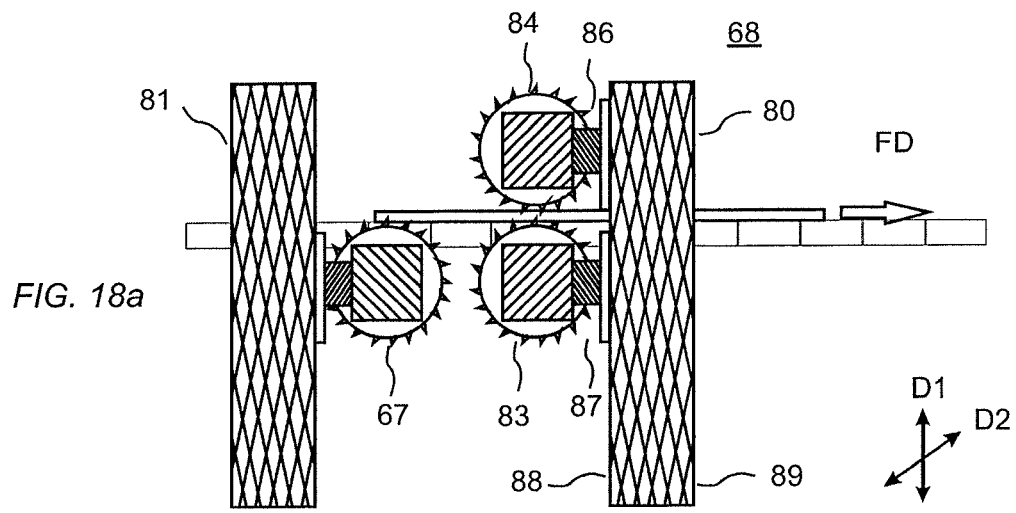
FIGS. 18a-18b are side views of exemplary embodiments of a tool setup solution, alternatives to the COMBI tool and incorporating a preprocessing step, according to the invention.
Figure 18B:
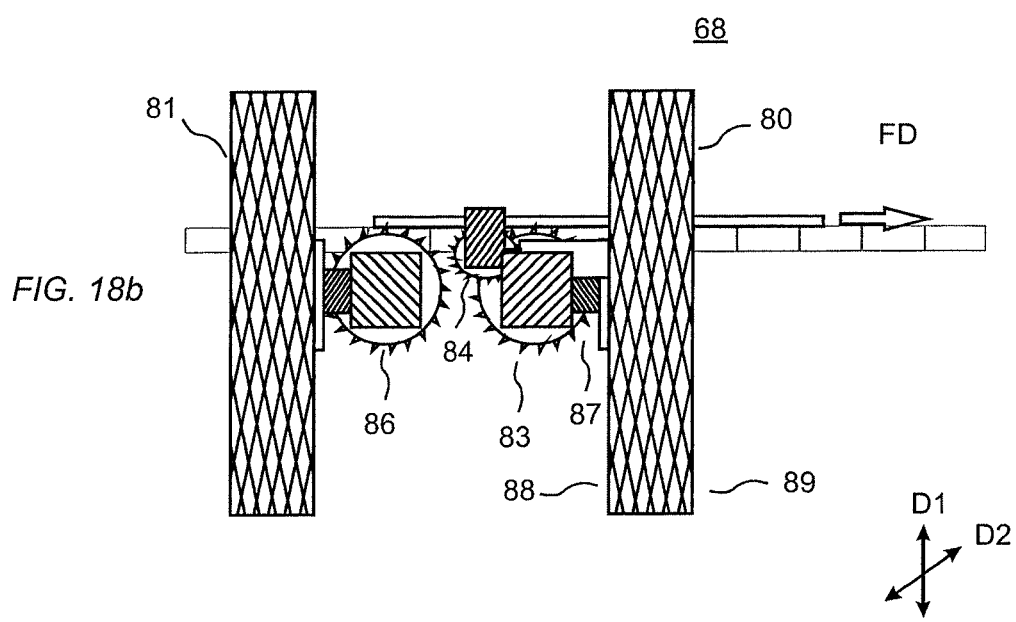

FIGS. 18*a*-18*b* is a profiling line illustrating exemplary embodiments of an alternative to the COMBI tool incorporating a preprocessing step according to the invention. Double engines 83, 84 were one tool 84 is cutting from the top and the other tool is cutting from underneath 83. Since these tools are positioned on the same column 80 of the machine and on the same side 88 of the column 80, the same effect will be obtained as with using a COMBI tool 68. The angle of the tool will then be limited by the locking surface angle. Tool 83 and 84 can be spaced slightly on the column 80, and they can both operate from the same side of the board on for instance the groove side 1 with angled locking surfaces on the locking element, when tool 83 is larger than tool 84 and this engine is angled. This has not been possible before since the tool that cut in the wear resistant surface layer has been forced to operate in the horizontal plane and has thereby blocked other tools from entering the tongue groove. Either one of these tools, or both, can be changed into scarping tool configurations and then it is possible to profile all sort of geometries, for instance 90 degrees locking surfaces on the locking element. Crucial for the profiling accuracy is that the point of machining from each tool body must be close to each other. This could also be obtained by using several very small rotary tools which can then come close to each other due the small tool diameters, i.e. technically equivalent as using big tools mounted on a column on the same side of the column. It is in the case of using several small tools preferable to use one or several large rotary tools for removing the majority of material and using a set of very small motors mounted side by side to remove the very final material creating the final locking surfaces. They can for instance be spaced with not more than 40 mm between each tool shaft TD.

Figure 19A:
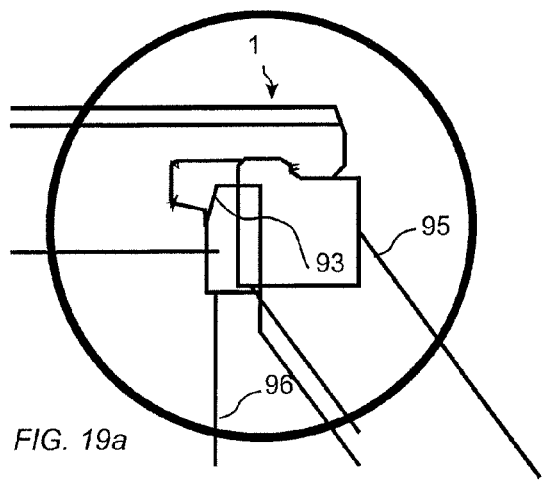
FIGS. 19a-19c are cross sections of exemplary embodiments of COMBI tools and its cutting surfaces, according to the invention.
Figure 19B:
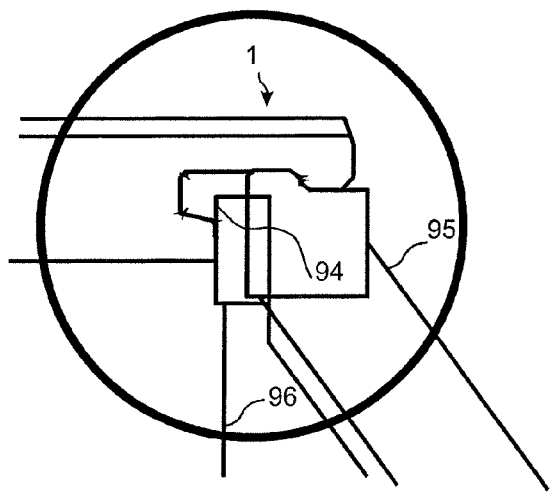
Figure 19C:
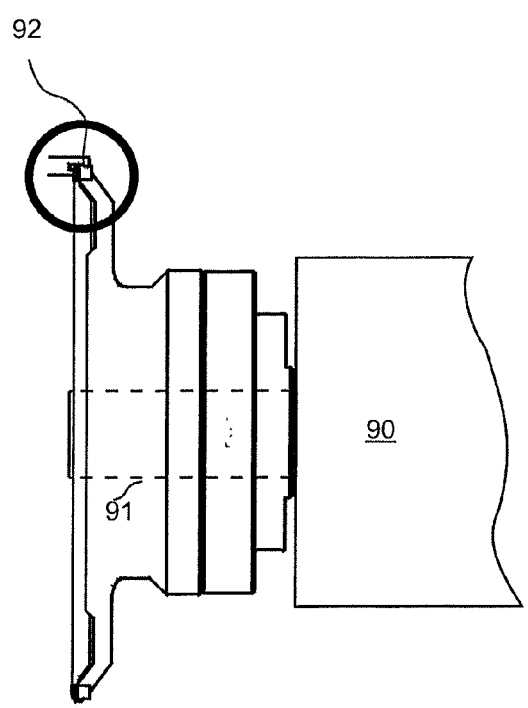

FIGS. 19*a*-19*c* illustrate the fine cutter tip 93, 94 of an exemplary embodiment of a tool configuration cutting from underneath, according to the invention. If the top layer consists of very hard particles or big particles the tip of the tool can be stressed so much so the corner breaks, especially if for instance the tool tip 94 has a 90 degrees corner as in FIG. 19*b*. It is also possible for the tool tip to be sharper than 90 degrees. If the edge of the tool tip breaks, a blunt initial cutting edge will be created that can engage in the final edge of the floorboard. This in return can create chippings.

A solution to this problem is to make the tip 93 wedge shaped as in FIG. 19*a*. The initial engaging position will then not be at the final edge portion instead move inwards gradually as the tool rotates. In the case of the corner cracking, the rest of the flange will still be sharp and since the engagement point of the flange moves inwards during rotation the chipping will be cut away, giving a sharp final edge portion.

Figure 20A:
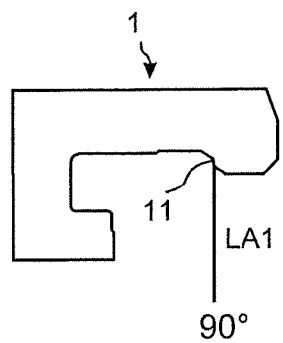
FIGS. 20a-20f are cross sections of exemplary embodiments of a COMBI tool and how it can vary in position, according to the invention.
Figure 20D:
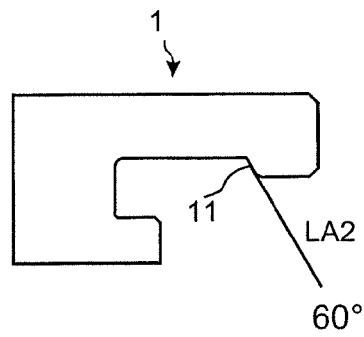
Figure 20B:
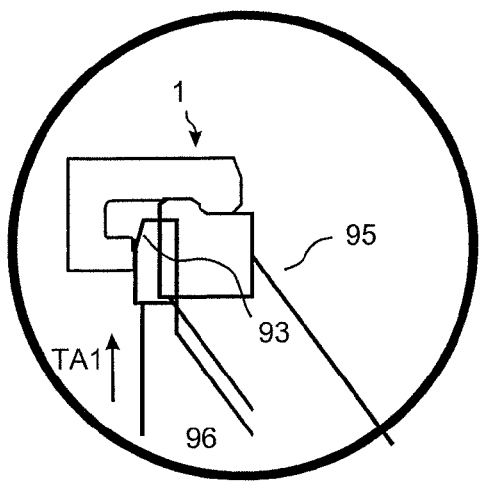
Figure 20E:
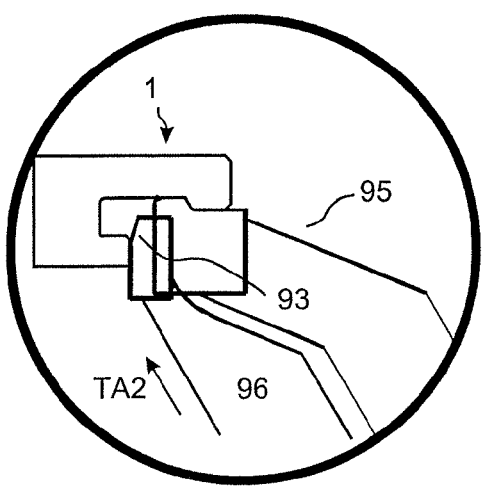
Figure 20C:
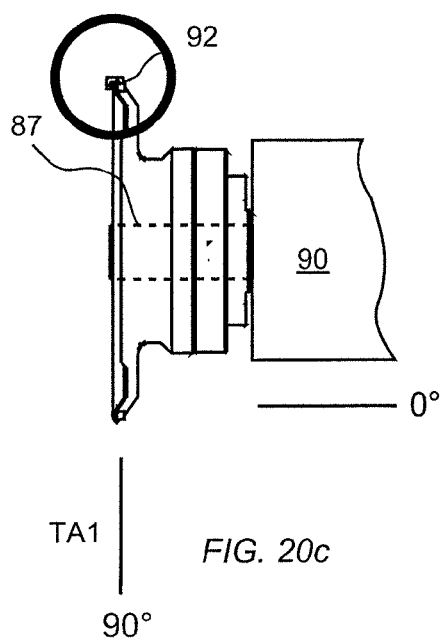
Figure 20F:
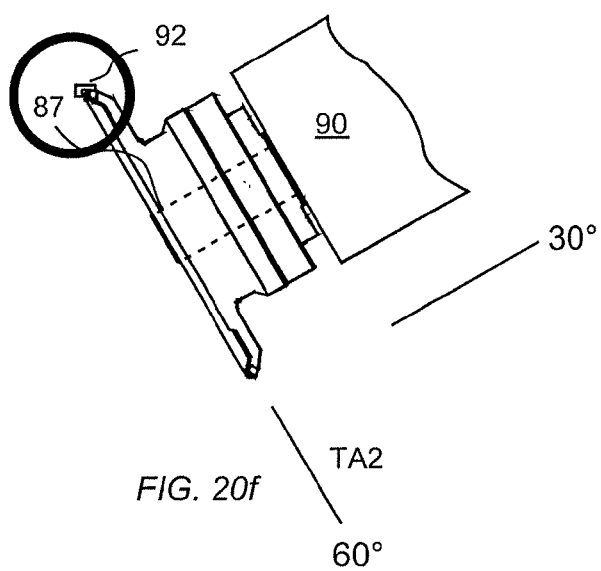

FIGS. 20*a*-20*f* illustrate an exemplary embodiment of the COMBI tool 68 and how it can vary in position, according to the invention. A COMBI tool 68 works by cutting rotating about an axis, its shaft. By angling the shaft of the COMBI tool in different angles different cutting surfaces angles of the mechanical locking system can be produced. The position of the shaft can be varied between being substantially parallel to the top surface layer 31 and being placed in position so the surface of the rotating disk is equal to the locking angle LA1-LA2 of the locking surface 11. It means the cutting teeth can be adjusted to profile locking surfaces with different tool angles. Two different examples are shown in FIGS. 20*a* and 20d of vertical locking angles, 90 degrees, and a locking angle with 60 degrees. In FIGS. 20c and 20f are shown how corresponding tool angles TA of rotating disk surfaces are adjusted to be able to profile those locking surfaces. The locking element side solution can vary slightly dependent on the geometry of the locking system.

Figure 21A:
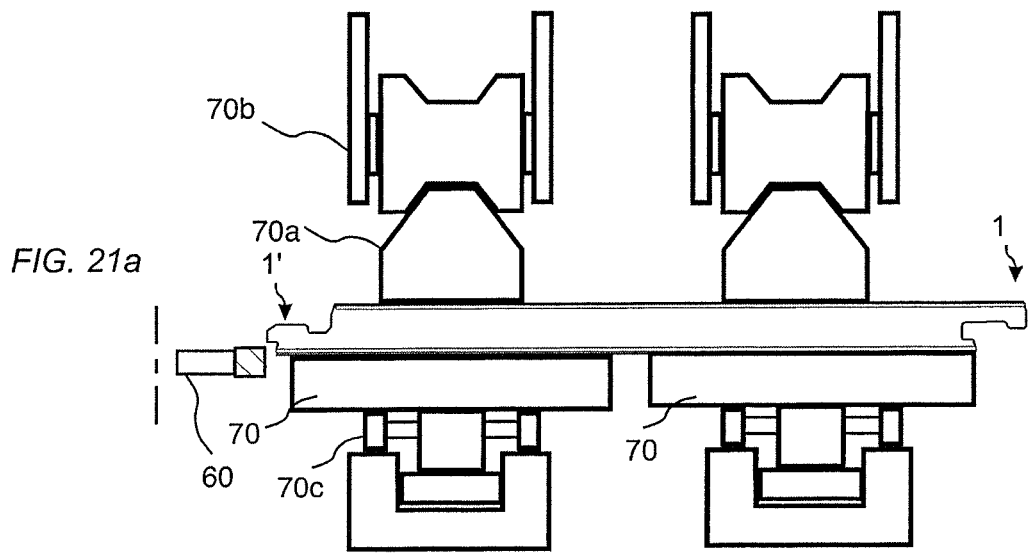
FIGS. 21a-21b is cross section of a side view from the short side of the floor panel with exemplary embodiments of an equipment for producing improved mechanical locking systems in opposite edges of a floor panel.
Figure 21B:
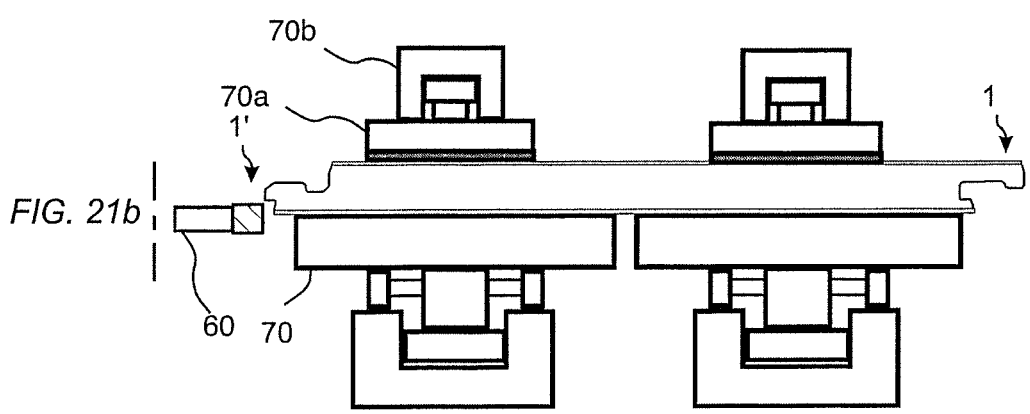

FIGS. 21a and 21b are exemplary embodiments of an equipment for producing mechanical locking systems in opposite edges of a floor panel comprising a lower chain 70, an upper belt or chain 70a, and several tool configurations for forming the opposite edges, according to the invention. The floor panel 1 is displaced in a feeding direction by the lower chain 70 or the upper belt or chain 70a with its decorative front side in contact with the lower chain. The lower chain is guided vertically and horizontally with a lower guiding device 70c. The upper belt or chain is guided in a horizontal direction by an upper guiding device 70b and configured such that it presses the floor panel vertically towards the lower chain. The guiding devices 70c and 70b are configured such that a horizontal deviation from a straight feeding direction between two tool configurations is essentially equal or smaller of the upper belt or chain than the corresponding deviation of the lower chain. FIG. 21a shows a floor panel 1 which is mainly guided in a straight horizontal direction along the feeding direction with one or several upper belts 70a. FIG. 21b shows that the same guiding can be made with upper chains 70a.

Figure 22A:
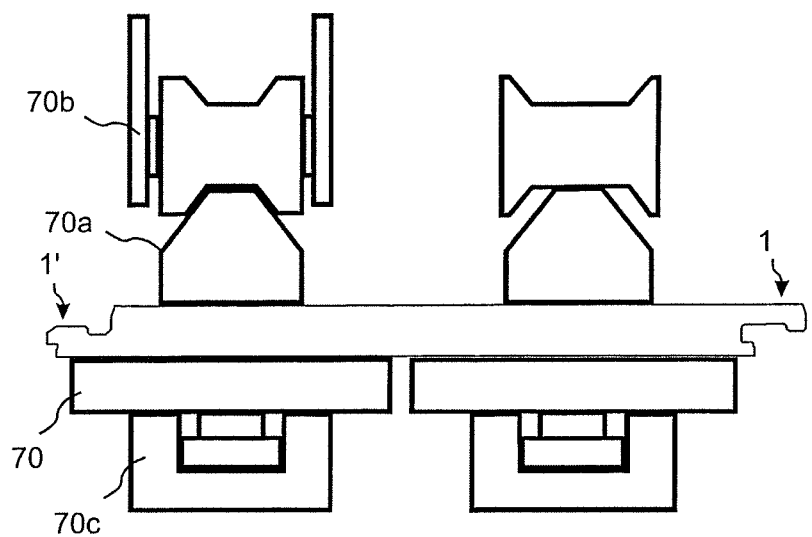
FIGS. 22a-22b is cross section of a side view from the short side of the floor panel with exemplary embodiments of an equipment for producing mechanical locking systems in opposite edges of a floor panel.
Figure 22B:
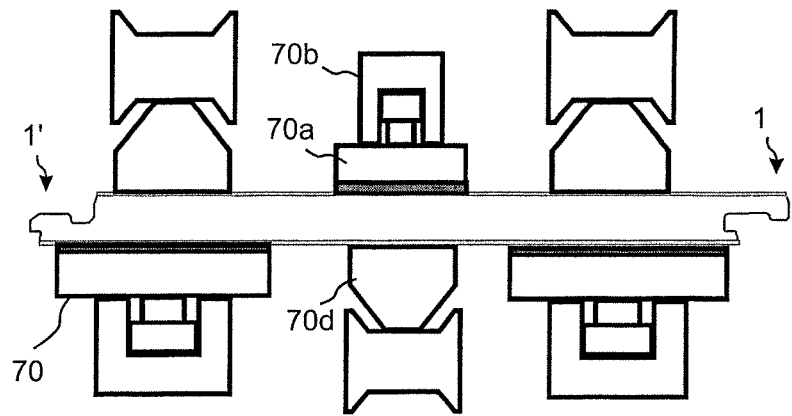

FIG. 22a show an embodiment where only one upper belt 70a has a horizontal guiding device 70b. The other belt 70a' is a conventional belt. FIG. 22b shows that an upper chain 70a or belt which cooperates with a lower chain or belt 70d can be installed between a conventional chain/belt equipment in order to guide the panel horizontally during machining.

Several advantages can be reached with production equipment where the horizontal guiding is essentially obtained by an upper chain or belt. The rear side of the floor panel, which is in contact with the belt or chain, can be formed with a surface, which can create a high friction. The belt or the upper chain can also have a high friction surface. Such a surface can even create some embossing of the rear side without any negative effect on the quality of the floor panel. A very strong connection between the upper belt or chain and the floor panel can be obtained independent of the surface structure of the decorative side, which is in contact with the lower chain. The equipment offers also the advantages that no additional guiding grooves are needed and that no separate adjustment of the guiding parts are required if the size of the panel or the locking system is changed. Different thicknesses of the floorboard can for example be compensated with an upper chain that has a flexible chain plate. The whole chain or belt can also be displaceable vertically.

Figure 23A:
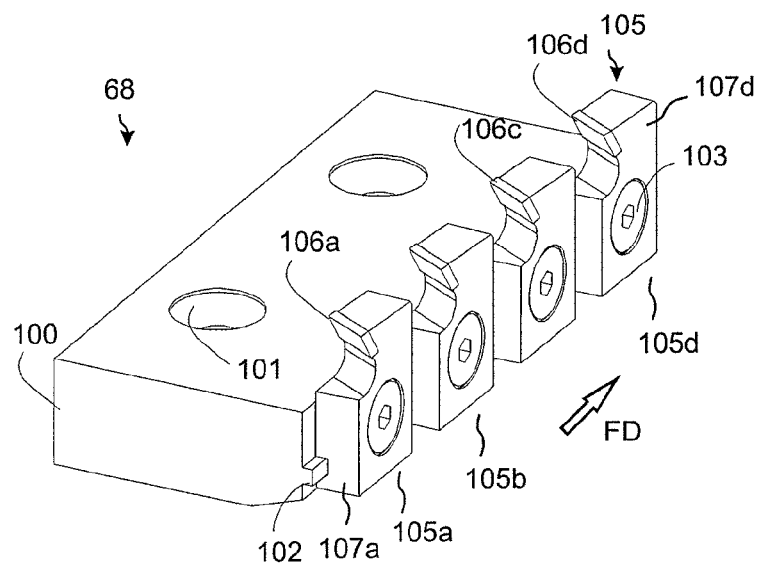
FIGS. 23a-23b is an exemplary embodiment of a scraping tool configuration, an alternative to the COMBI tool, according to the invention.

FIG. 23a shows an exemplary embodiment of a tool configuration 68, according to the invention. Here it is an exemplary embodiment of a scraping tool configuration 68 that comprises a plurality of chip-removing portions 106a-d which are located along the feeding direction FD in certain positions in relation to each of the plurality of the other chip-removing portions and the edge of a floor panel where a locking system will be formed. The scraping tool configuration 68 have fixed teeth, each tooth 105a-d comprises of the chip-removing portion 106a-d, e.g. a cutting surface which is hereinafter called a tip 106 and is set on a holder 107a-d. A typical tooth 105 is fixed to a fixture 100 with e.g. a screw 103. Preferably a number of teeth, i.e. tip holders 107 can be fixed to the same fixture 100, e.g. 2-8 or more. An exemplary way of fixating the teeth 105 is by positioning each tooth on a bar 102 on the fixture 100. Each fixture 100 has screw holes 101 to be used to fixate the whole fixture 100 in the profiling line. Each tip 106a-d on the tip holder 107a-d is arranged on the fixture 100 in a way that each successive tip 106 has a different position horizontally or vertically or both horizontally and vertically. When using the scraping tool configuration the dust and chips is for example easily taken care of by simple dust extraction nozzles at each tip.

It is shown how the different tip holders 105a-d having the same size on the fixture 100. The tips 106a-d then follow a tip line. Another exemplary embodiment according to the invention is to have the tooth offset vertically and/or horizontally. The first tooth 105a can for example have a size, which is "shorter" than the second "taller" tooth 105b etc. In this way the first tooth 105a would come into the surface of the material to be removed being "short" enough to hit into the material to be removed, and the second tooth 105b have now to remove a next layer of material which is further away from the tip 106b, and need thereby to be "taller". In this way the tips on the fixture 100 studying them from the side would have an increasing slope starting from the "shortest" first tooth 105a and ending with the "tallest" in last position 105d.

Figure 23B:
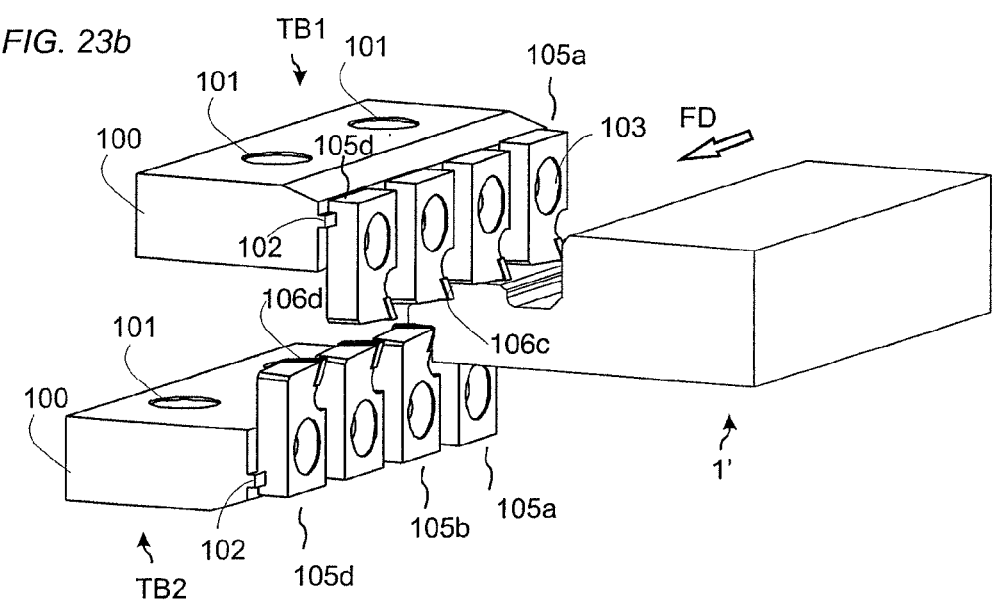

FIG. 23b illustrates an exemplary embodiment of how the production tolerances can be eliminated, according to the invention. Here the scraping tool configuration 68 is illustrated as an example. A scraping tool configuration have then not only two opposite tool stations in the feeding direction but an upper tool body TB1 as well as a bottom tool body TB2 can eliminate the tolerances as they work positioned close to each other, machining the cooperating locking surfaces 19, 11; 12, 18 in the same step the tolerance is decreased. Dependent on what locking system to produce the shape of the tips are formed and how the teeth are positioned on the fixtures are dependent on if to profile the material from above or from below It will be understood by those skilled in the art that various modifications and changes may be made to the present invention without departure from the scope thereof, which is defined by the appended claims.

The invention claimed is:

1. A method for producing mechanical locking systems in a floor panel using a first tool configuration, the floor panel comprising:
   a surface layer, a core and mechanical locking systems on a first and second edge for horizontal locking of the floor panel with similar other panels, the mechanical locking system comprising:
   a first pair of locking surfaces in the first edge of a panel and a second pair of locking surfaces in the opposite second edge, the first pair of locking surfaces comprises a first upper edge and a locking element, the second pair of locking surfaces comprises a second upper edge and a locking groove,
   wherein the method comprises:
      displacing the floor panel in a feeding direction with its first edge relative to a first tool configuration, the first tool configuration comprises a first tool body and a second tool body positioned on a same side of a first column having two opposite column sides,
      forming by the first and second tool body at least a part of the first pair of locking surfaces
   wherein the first tool configuration is a rotating tool configuration comprising the first tool body having a first tool disk and the second tool body having a second tool disk, and the method comprising driving the first and second tool disk with one rotary shaft, the disks being adjustable in relation to each other.

2. The method according to claim 1, further comprising displacing the floor panel in the feeding direction with its second edge relative to a second tool configuration, and the second tool configuration comprises a first tool body and a second tool body positioned on a same side of a second column having two opposite column sides, forming by the second tool configuration at least a part of at least one of the surfaces of the second pair of locking surfaces.

3. The method according to claim 2, wherein the first tool body of the second tool configuration comprises a first tool disk and the second tool body of the second tool configuration comprises a second tool disk, and wherein the method further comprises driving the first tool disk of the second tool configuration with a first rotary shaft and the second tool disk of the second tool configuration with a second rotary shaft, the first and second rotary shaft being mounted on the same side of the column.

4. The method according to claim 1, the method comprising machining with the first tool configuration having at least the first tool disk surface substantially parallel with a vertical tool angle of the first tool configuration or parallel with a locking angle of any one of the locking surfaces, or substantially parallel with any angle between a vertical tool angle of the first tool configuration and a locking angle of any one of the locking surfaces.

* * * * *